US012653747B2

(12) United States Patent
Bonutti et al.

(10) Patent No.: US 12,653,747 B2
(45) Date of Patent: Jun. 16, 2026

(54) ORTHOSIS FOR RANGE OF MOTION

(71) Applicant: Bonutti Research, Inc., Effingham, IL (US)

(72) Inventors: Peter M. Bonutti, Manalapan, FL (US); Glen A. Phillips, Effingham, IL (US); Joseph Mathewson, Effingham, IL (US)

(73) Assignee: Bonutti Research, Inc., Manalapan, FL (US)

(*) Notice: Subject to any disclaimer, the term of this patent is extended or adjusted under 35 U.S.C. 154(b) by 0 days.

(21) Appl. No.: 18/470,378

(22) Filed: Sep. 19, 2023

(65) Prior Publication Data

US 2024/0082094 A1 Mar. 14, 2024

Related U.S. Application Data

(63) Continuation of application No. 16/423,941, filed on May 28, 2019, now Pat. No. 11,786,434, which is a
(Continued)

(51) Int. Cl.
*A61H 1/00* (2006.01)
*A61H 1/02* (2006.01)

(52) U.S. Cl.
CPC ............... *A61H 1/00* (2013.01); *A61H 1/006* (2013.01); *A61H 1/008* (2013.01); *A61H 1/02* (2013.01); *A61H 1/024* (2013.01); *A61H 1/0277* (2013.01); *A61H 1/0285* (2013.01); *A61H 2001/0207* (2013.01); *A61H 2201/0153* (2013.01);
(Continued)

(58) Field of Classification Search
CPC .......... A61H 1/00; A61H 1/006; A61H 1/008; A61H 1/02; A61H 1/024; A61H 1/0277; A61H 1/0285; A61H 2201/0207; A61H 2201/0153; A61H 2201/0192; A61H 2201/1207; A61H 2201/1253; A61H 2201/14; A61H 2201/1472; A61H 2201/1638; A61H 2201/1642; A61H 2201/165; A61H 2201/1676; A61H 2201/0237; A61H 2201/0274; A61H 2201/0157; A61H 2201/12; A61H 2201/1418; A61H 2201/1436; A61H 2201/1481; A61H 2201/149; A61H 2201/1635
See application file for complete search history.

(56) References Cited

U.S. PATENT DOCUMENTS 1,375,652 A * 4/1921 Carlotti ............. A61H 15/0078
91/25
1,984,397 A * 12/1934 Dalyze .................. A61H 1/001
601/92
(Continued)

FOREIGN PATENT DOCUMENTS

WO WO-0009066 A2 * 2/2000 ........... A61H 1/0237
WO WO2014146824 A1 9/2014
WO WO2016069713 A1 5/2016

*Primary Examiner* — Timothy A Stanis
*Assistant Examiner* — Tyler A Raubenstraw
(74) *Attorney, Agent, or Firm* — Stinson LLP

(57) ABSTRACT

In one aspect, an orthosis for increasing range of motion of a body joint generally includes first and second dynamic force mechanisms for simultaneously applying a dynamic force to body portions on opposite sides of a body joint.

18 Claims, 32 Drawing Sheets

Related U.S. Application Data continuation of application No. 15/061,664, filed on Mar. 4, 2016, now Pat. No. 10,307,319.

(60) Provisional application No. 62/137,207, filed on Mar. 23, 2015, provisional application No. 62/128,225, filed on Mar. 4, 2015.

(52) U.S. Cl.
CPC ................ *A61H 2201/0192* (2013.01); *A61H 2201/1207* (2013.01); *A61H 2201/1253* (2013.01); *A61H 2201/14* (2013.01); *A61H 2201/1472* (2013.01); *A61H 2201/1638* (2013.01); *A61H 2201/1642* (2013.01); *A61H 2201/165* (2013.01); *A61H 2201/1676* (2013.01)

(56) References Cited

U.S. PATENT DOCUMENTS

| | | | | |
|---|---|---|---|---|
| 3,976,057 | A | 8/1976 | Barclay | |
| 4,747,394 | A | 5/1988 | Watanabe | |
| 5,147,266 | A * | 9/1992 | Ricard | A61H 1/0244 482/133 |
| 5,285,773 | A | 2/1994 | Bonutti et al. | |
| 5,503,619 | A | 4/1996 | Bonutti et al. | |
| 5,611,764 | A | 3/1997 | Bonutti et al. | |
| 5,848,979 | A | 12/1998 | Bonutti et al. | |
| 5,891,061 | A | 4/1999 | Kaiser | |
| 5,954,678 | A * | 9/1999 | Cruz | A61F 5/0123 602/26 |
| 6,113,562 | A * | 9/2000 | Bonutti | A61F 5/013 602/5 |
| 6,537,237 | B1 * | 3/2003 | Hopkins | A63B 21/4025 602/5 |
| 6,666,837 | B2 * | 12/2003 | Weihermuller | A61F 5/0123 602/26 |
| 7,473,234 | B1 * | 1/2009 | Weltner | A61F 5/013 602/5 |
| 8,002,719 | B2 * | 8/2011 | Ashihara | B25J 9/0006 601/5 |
| 8,012,108 | B2 * | 9/2011 | Bonutti | A61H 1/0218 601/5 |
| 8,460,222 | B2 * | 6/2013 | Garrec | A61H 1/0277 602/5 |
| 2001/0041828 | A1 | 11/2001 | Deckman et al. | |
| 2004/0210169 | A1 * | 10/2004 | Hepburn | A61H 1/0285 601/40 |
| 2004/0215111 | A1 | 10/2004 | Bonutti et al. | |
| 2005/0197605 | A1 | 9/2005 | Bonutti et al. | |
| 2007/0038161 | A1 * | 2/2007 | Bonutti | A61F 5/013 601/5 |
| 2007/0055190 | A1 | 3/2007 | Bonutti et al. | |
| 2008/0039873 | A1 * | 2/2008 | Bonutti | A61B 17/0485 606/139 |
| 2008/0188356 | A1 | 8/2008 | Bonutti et al. | |
| 2009/0221943 | A1 * | 9/2009 | Burbank | A61H 1/0266 601/46 |
| 2009/0264799 | A1 * | 10/2009 | Bonutti | A61H 1/0274 601/5 |
| 2010/0114330 | A1 * | 5/2010 | Shishido | A61H 3/008 623/27 |
| 2011/0130793 | A1 | 6/2011 | Woolley et al. | |
| 2011/0224497 | A1 | 9/2011 | Weilman et al. | |
| 2013/0345612 | A1 * | 12/2013 | Bannister | A61F 5/02 602/19 |
| 2014/0100492 | A1 * | 4/2014 | Nagasaka | A61H 1/0262 601/34 |
| 2014/0207030 | A1 * | 7/2014 | Hall | A61H 1/024 601/34 |
| 2015/0374573 | A1 * | 12/2015 | Horst | F16H 19/0628 74/89.22 |

* cited by examiner

ORTHOSIS FOR RANGE OF MOTION

CROSS-REFERENCE TO RELATED APPLICATION

This application is a continuation of U.S. Non-Provisional application Ser. No. 16/423,941 filed May 28, 2019, which is a continuation of U.S. Non-Provisional application Ser. No. 15/061,664 filed Mar. 4, 2016, issued as U.S. Ser. No. 10/307,319 on Jun. 4, 2019, which claims benefit from U.S. Provisional Application No. 62/137,207 filed Mar. 23, 2015 and U.S. Provisional Application No. 62/128,225 filed Mar. 4, 2015, the entire contents of which are incorporated herein by reference.

FIELD OF THE DISCLOSURE

The present disclosure generally relates to an orthosis for treating a joint of a subject, and in particular, and orthosis for increasing range of motion of the joint of the subject.

BACKGROUND OF THE DISCLOSURE

In a joint of a body, its range of motion depends upon the anatomy and condition of that joint and on the particular genetics of each individual. Many joints primarily move either in flexion or extension, although some joints also are capable of rotational movement in varying degrees. Flexion is to bend the joint and extension is to straighten the joint; however, in the orthopedic convention some joints only flex. Some joints, such as the knee, may exhibit a slight internal or external rotation during flexion or extension. Other joints, such as the elbow or shoulder, not only flex and extend but also exhibit more rotational range of motion, which allows them to move in multiple planes. The elbow joint, for instance, is capable of supination and pronation, which is rotation of the hand about the longitudinal axis of the forearm placing the palm up or the palm down. Likewise, the shoulder is capable of a combination of movements, such as abduction, internal rotation, external rotation, flexion and extension.

When a joint is injured, either by trauma or by surgery, scar tissue can form or tissue can contract and consequently limit the range of motion of the joint. For example, adhesions can form between tissues and the muscle can contract itself with permanent muscle contracture or tissue hypertrophy such as capsular tissue or skin tissue. Lost range of motion may also result from trauma such as excessive temperature (e.g., thermal or chemical burns) or surgical trauma so that tissue planes which normally glide across each other may become adhered together to markedly restrict motion. The adhered tissues may result from chemical bonds, tissue hypertrophy, proteins such as Actin or Myosin in the tissue, or simply from bleeding and immobilization. It is often possible to mediate, and possibly even correct this condition by use of a range-of-motion (ROM) orthosis.

ROM orthoses are used during physical rehabilitative therapy to increase the range-of-motion of a body joint. Additionally, they also may be used for tissue transport, bone lengthening, stretching of skin or other tissue, tissue fascia, and the like. When used to treat a joint, the device typically is attached on body portions on opposite sides of the joint so that is can apply a force to move the joint in opposition to the contraction.

A number of different configurations and protocols may be used to increase the range of motion of a joint. For example, stress relaxation techniques may be used to apply variable forces to the joint or tissue while in a constant position. "Stress relaxation" is the reduction of forces, over time, in a material that is stretched and held at a constant length. Relaxation occurs because of the realignment of fibers and elongation of the material when the tissue is held at a fixed position over time. Treatment methods that use stress relaxation are serial casting and static splinting. One example of devices utilizing stress relaxation is the JAS EZ orthosis, Joint Active Systems, Inc., Effingham, IL.

Sequential application of stress relaxation techniques, also known as Static Progressive Stretch ("SPS") uses the biomechanical principles of stress relaxation to restore range of motion (ROM) in joint contractures. SPS is the incremental application of stress relaxation—stretch to position to allow tissue forces to drop as tissues stretch, and then stretching the tissue further by moving the device to a new position—repeated application of constant displacement with variable force. In an SPS protocol, the patient is fitted with an orthosis about the joint. The orthosis is operated to stretch the joint until there is tissue/muscle resistance. The orthosis maintains the joint in this position for a set time period, for example five minutes, allowing for stress relaxation. The orthosis is then operated to incrementally increase the stretch in the tissue and again held in position for the set time period. The process of incrementally increasing the stretch in the tissue is continued, with the pattern being repeated for a maximum total session time, for example 30 minutes. The protocol can be progressed by increasing the time period, total treatment time, or with the addition of sessions per day. Additionally, the applied force may also be increased.

Another treatment protocol uses principles of creep to constantly apply a force over variable displacement. In other words, techniques and devices utilizing principles of creep involve continued deformation with the application of a fixed load. For tissue, the deformation and elongation are continuous but slow (requiring hours to days to obtain plastic deformation), and the material is kept under a constant state of stress. Treatment methods such as traction therapy and dynamic splinting are based on the properties of creep.

SUMMARY OF THE DISCLOSURE

In one aspect, an orthosis for increasing range of motion of a body joint generally comprises first and second dynamic force mechanisms for simultaneously applying a dynamic force to body portions on opposite sides of a body joint.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DISCLOSURE

Figure 1:
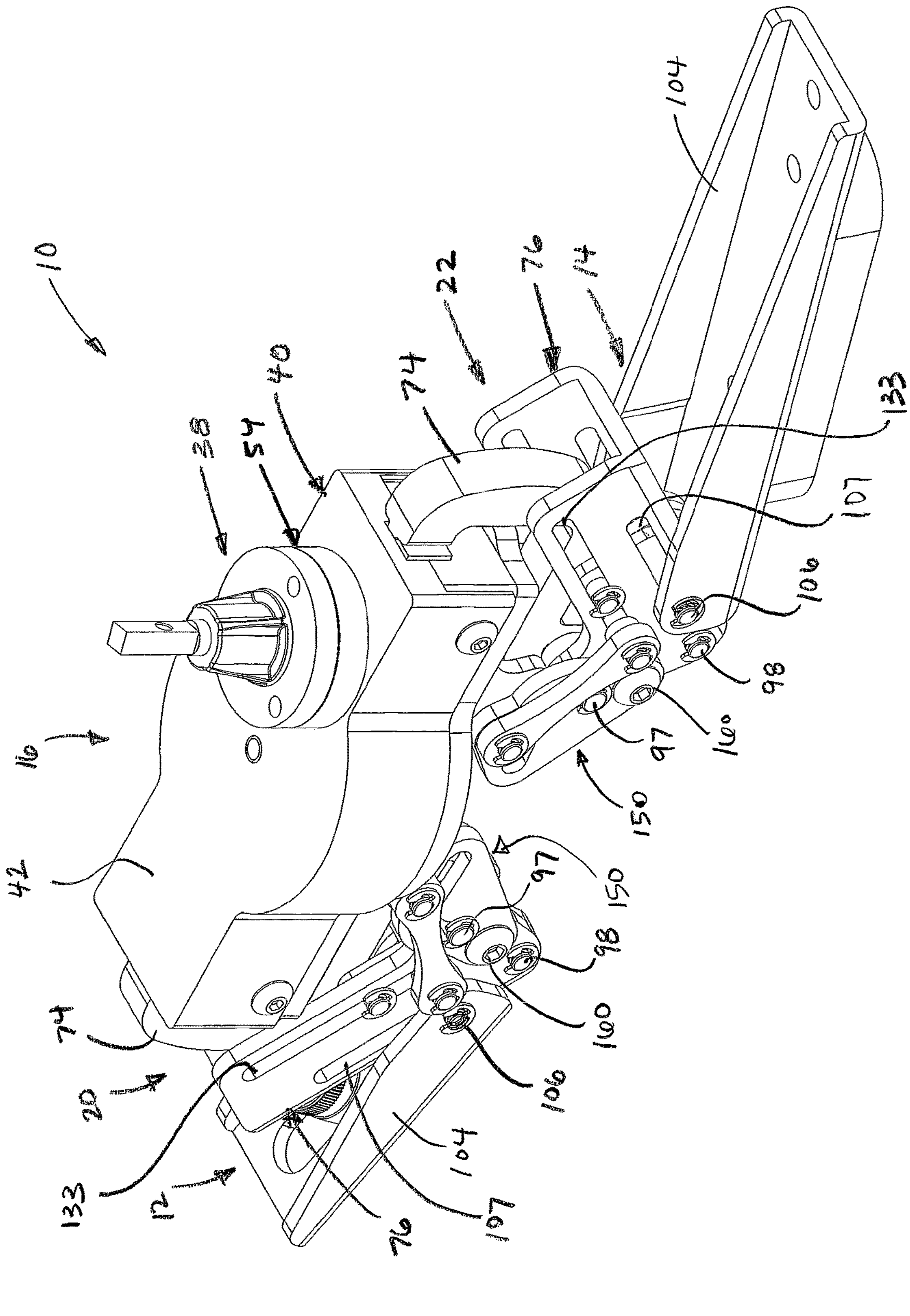
FIG. 1 is a perspective of one embodiment of an orthosis for use in treating a body joint in extension.

Referring to FIGS. 1-3 and 19-21, embodiments of orthoses for treating a joint of a subject are generally indicated at reference numeral 10 and 310, respectively. The general structure of the orthoses illustrated in FIGS. 1-3 and 19-21 are suitable for treating hinge joints (e.g., knee joint, elbow joint, and ankle joint) or ellipsoidal joints (e.g., wrist joint, finger joints, and toe joints) of the body. In particular, the configurations of the illustrated orthoses are suitable for increasing range of motion of a body joint in flexion, although in other configurations the orthosis is suitable for increasing range of motion of a body joint (i.e., a wrist joint) in extension. Various teachings of the orthosis set forth herein are also suitable for orthoses for treating other joints, including but not limited to the shoulder joint, and the radioulnar joint. Thus, in other embodiments the teachings of the illustrated orthoses 10, 310 may be suitable for increasing range of motion of a body joint in adduction and/or abduction (e.g., the shoulder joint) or in pronation and/or supination (e.g., the radioulnar joint), among other joints.

Figure 2:
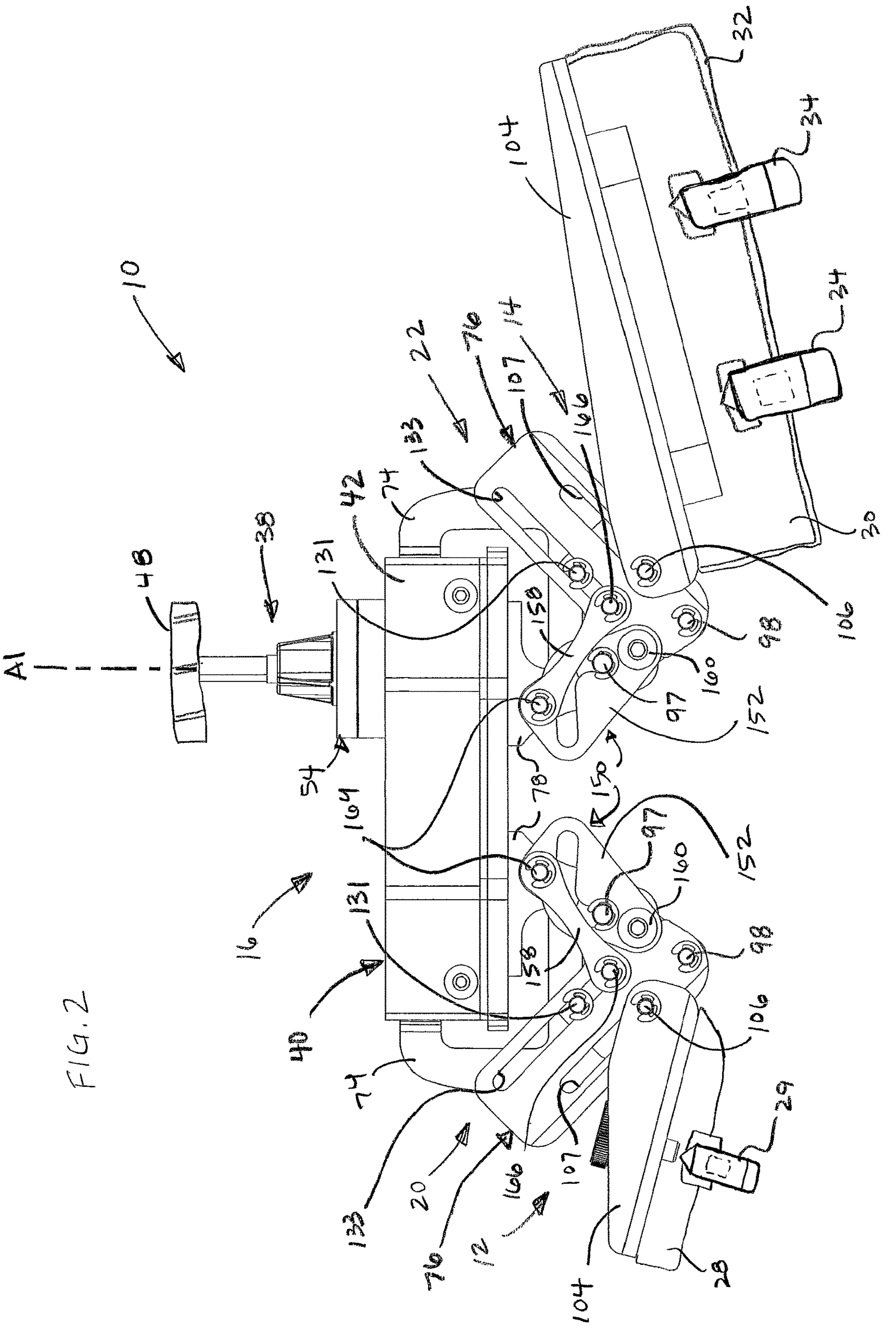
FIG. 2 is a front elevation of the orthosis, including first and second cuffs, being driven in a flexion direction.
Figure 3:
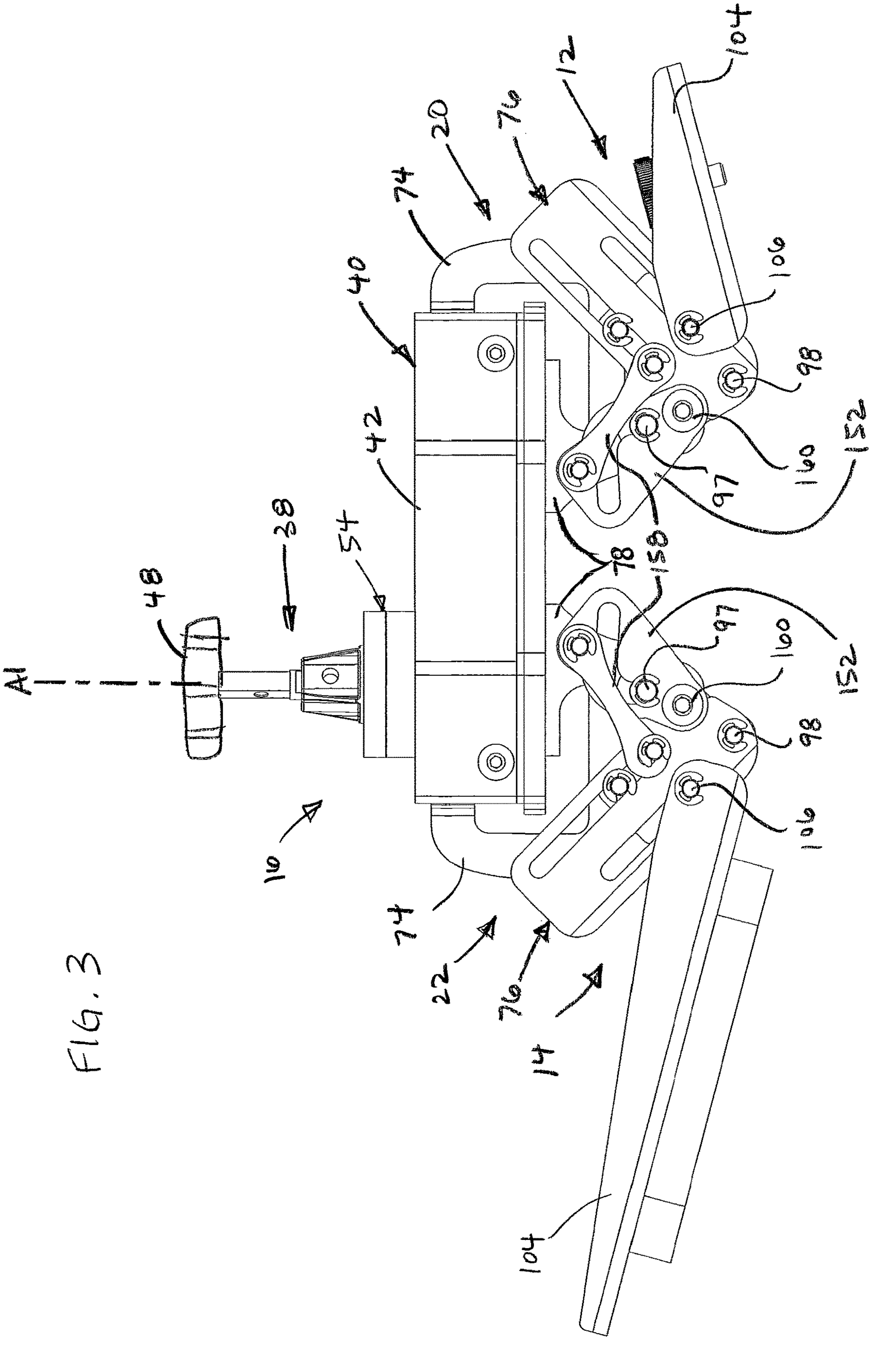
FIG. 3 is a rear elevation of the orthosis.

Referring first to FIGS. 1-3, the first illustrated orthosis 10 is a dynamic stretch orthosis comprising first and second dynamic force mechanisms, generally indicated at 12, 14, respectively, for applying a dynamic stretch to respective first and second body portions on opposite sides of a body joint. An actuator mechanism, generally indicated at 16, is operatively connected to first and second linkage mechanism, generally indicated at 20, 22, respectively, for transmitting force to respective first and second dynamic force mechanisms 12, 14 and loading the dynamic force mechanism during use, as will be explained in more detail below. As shown in FIG. 2, first and second cuffs, generally indicated at 24, 26, respectively (broadly, body portion securement members), are secured to the respective first and second dynamic force mechanisms 12, 14 for coupling the body portions to the first and second dynamic force mechanisms. In the illustrated embodiment, the first cuff 24 includes a hand pad 28 and a strap 29 for securing a hand to the hand pad; the second cuff 26 includes a plastic shell 30, an inner liner 32 comprising a soft, pliable material, at least one strap 34 and associated ring 36 secured to the plastic shell for fastening the body portion (e.g., a forearm) to the cuff. The strap(s) 29, 34 may include a hook-and-loop fastener as is generally known in the art. Other ways of attaching the cuffs 24, 26 to the desired body portions of opposite sides of a joint do not depart from the scope of the present invention.

As will be understood through the following disclosure, the orthosis 10 may be used as a combination dynamic and static-progressive stretch orthosis. It is understood that in other embodiments the dynamic force mechanisms 12, 14 may be omitted without departing from the scope of the present invention, thereby making the orthosis 10 suitable as a static stretch or static progressive stretch orthosis by utilizing the actuator mechanism 16 and/or linkage mechanisms 20, 22 of the illustrated orthosis. In addition, it is understood that that in other embodiments the orthosis may include the illustrated dynamic force mechanisms 12, 14, while omitting the illustrated actuator mechanism 16 and/or linkage mechanisms 20, 22. It is also understood that the orthosis 10 may be used to increase range of motion of a joint in extension.

Figure 4:
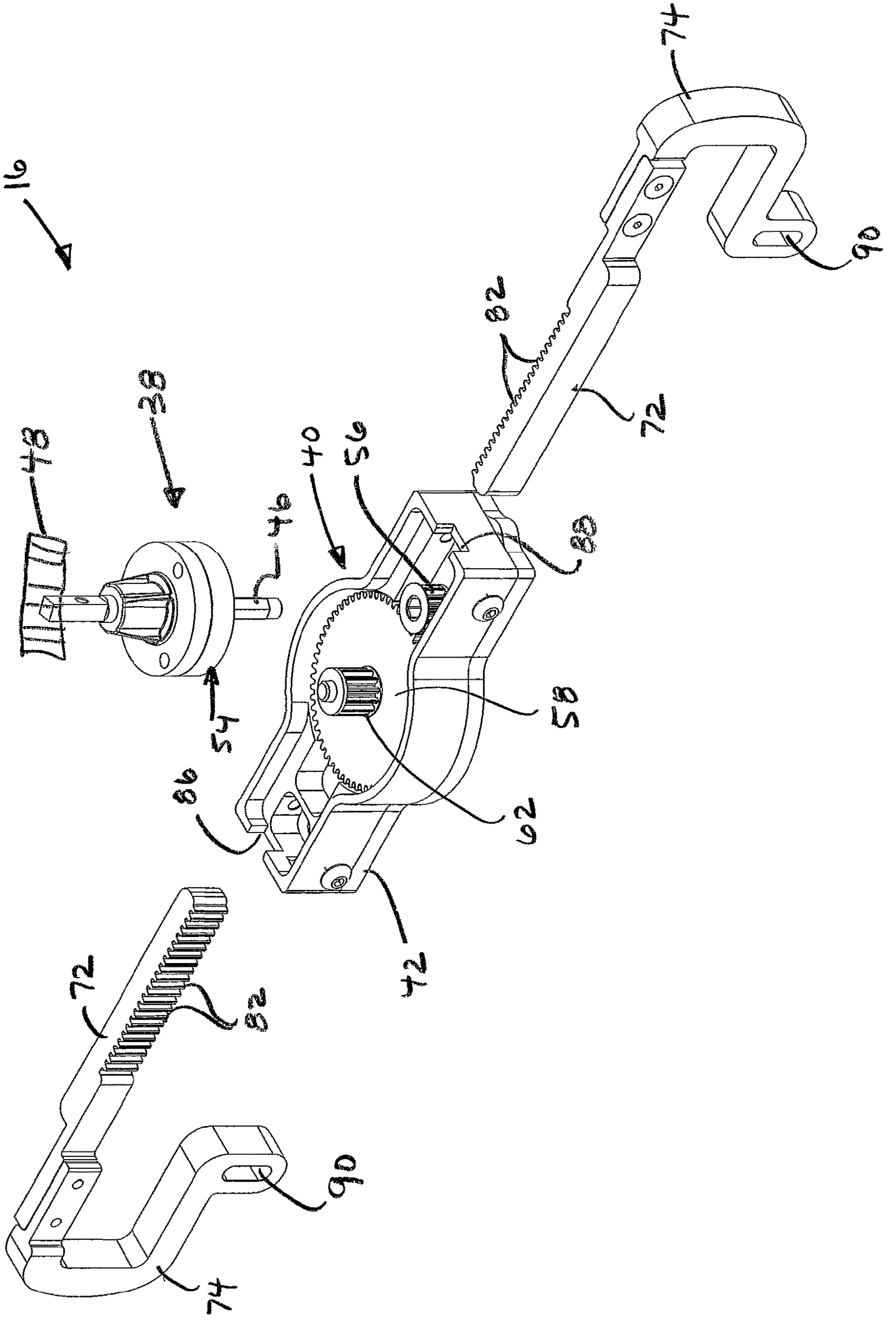
FIG. 4 is a partial exploded view of an actuator mechanism and a portion of a linkage mechanism of the orthosis.
Figure 5:
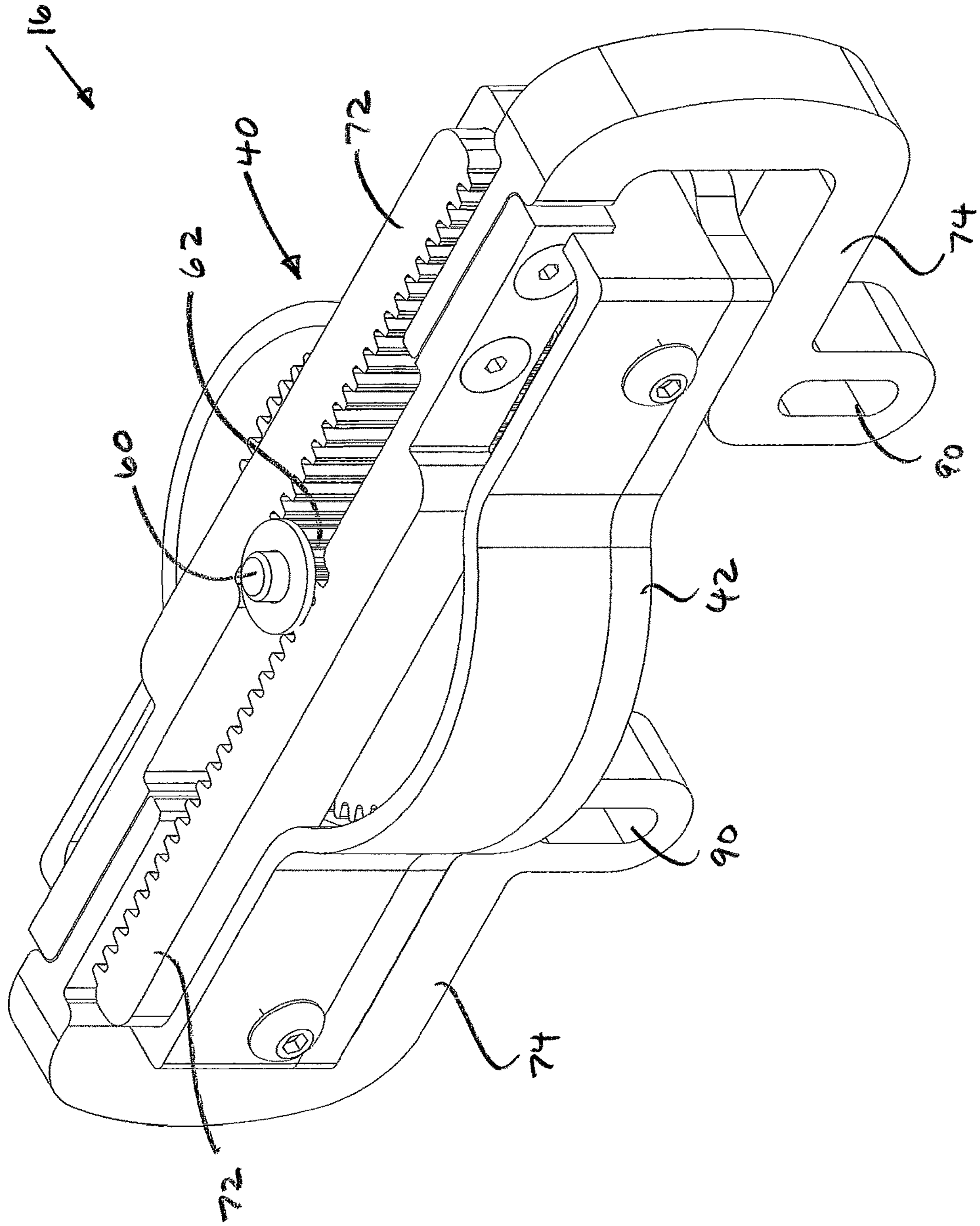
FIG. 5 is a perspective of a transmission assembly of the actuator mechanism and the portion of the linkage mechanism.
Figure 6:
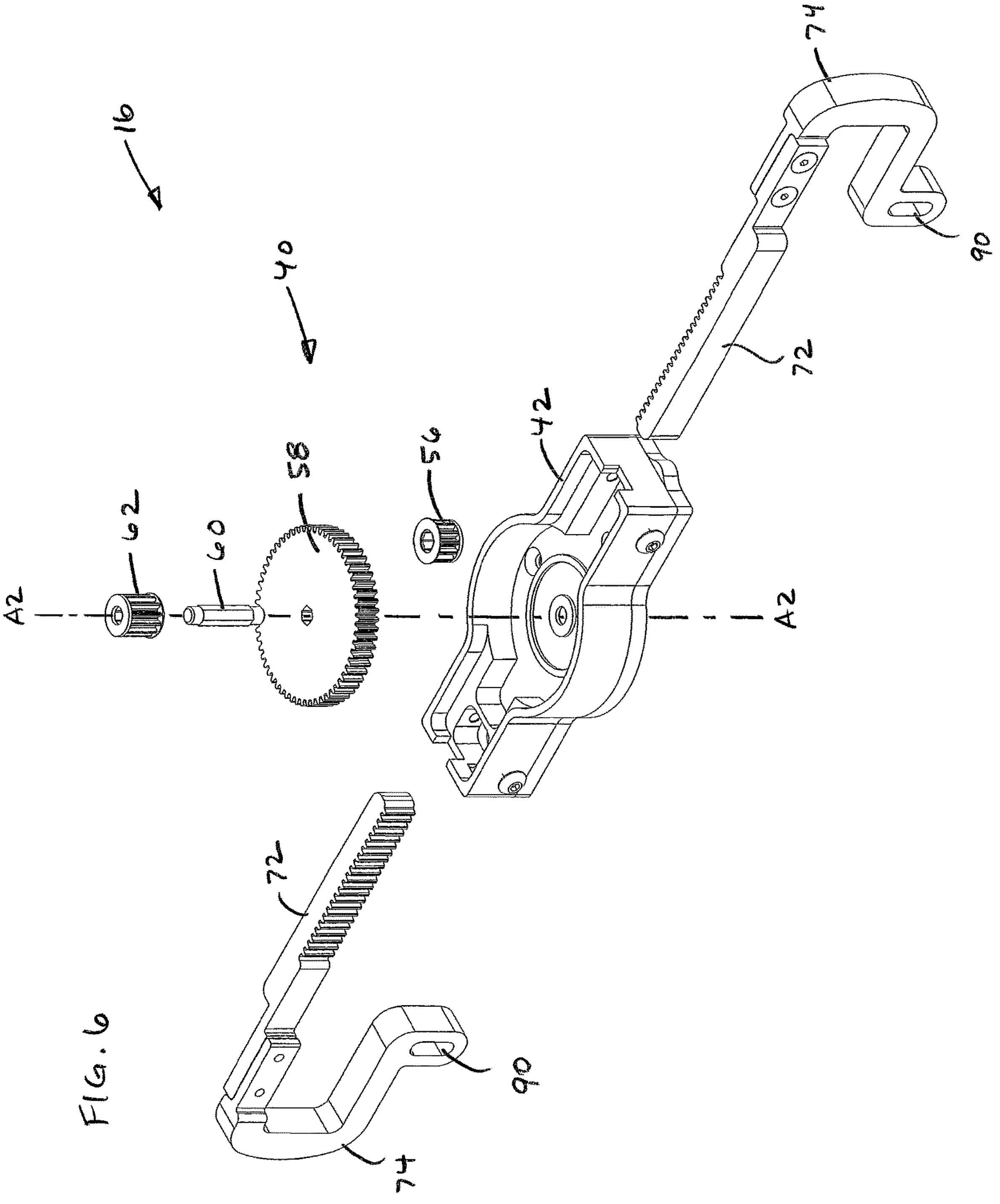
FIG. 6 is an exploded view of the transmission assembly of the actuator mechanism and the portion of the linkage mechanism.
Figure 17:
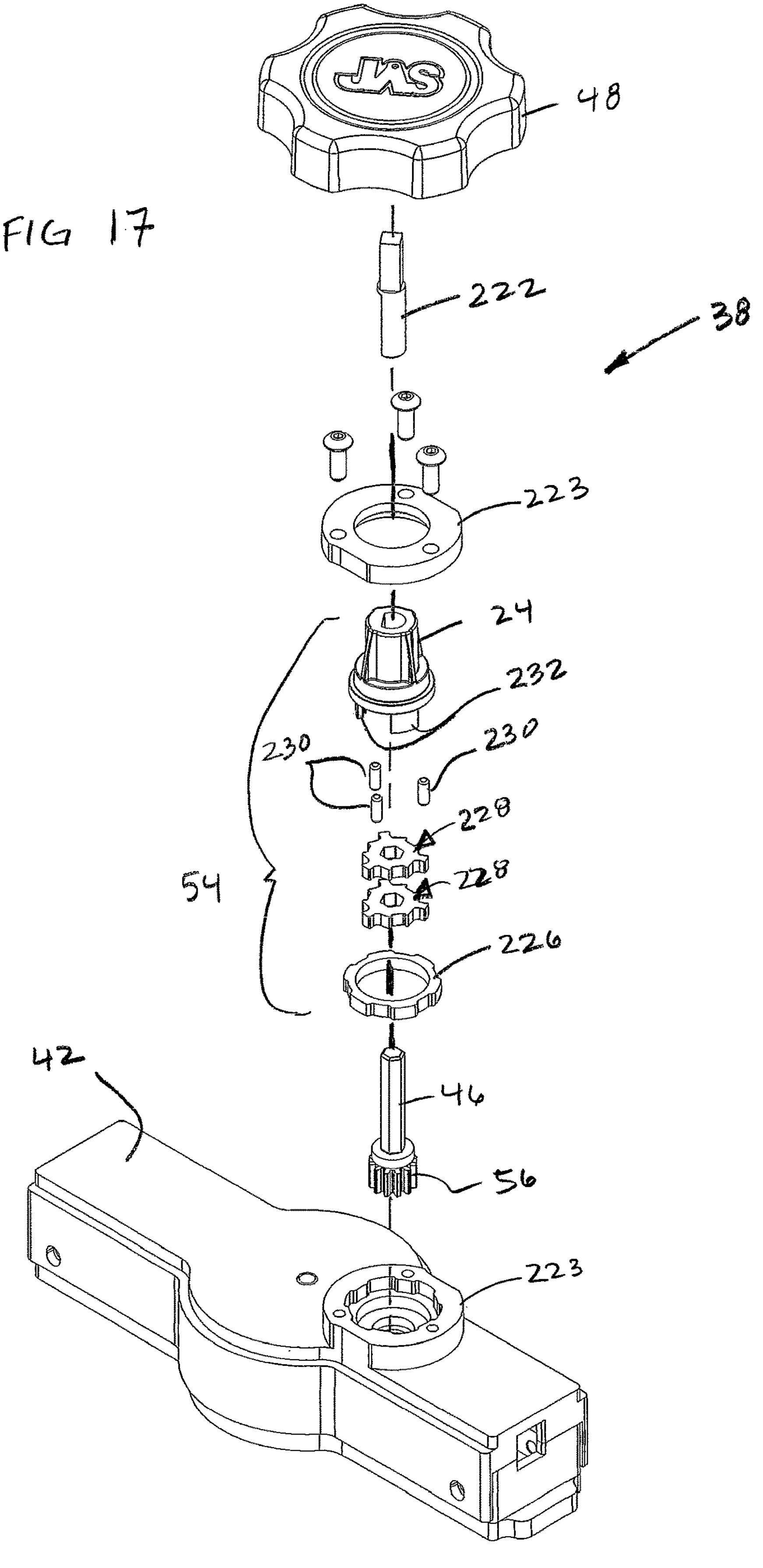
FIG. 17 is an exploded view of drive assembly and clutch mechanism thereof.
Figure 18:
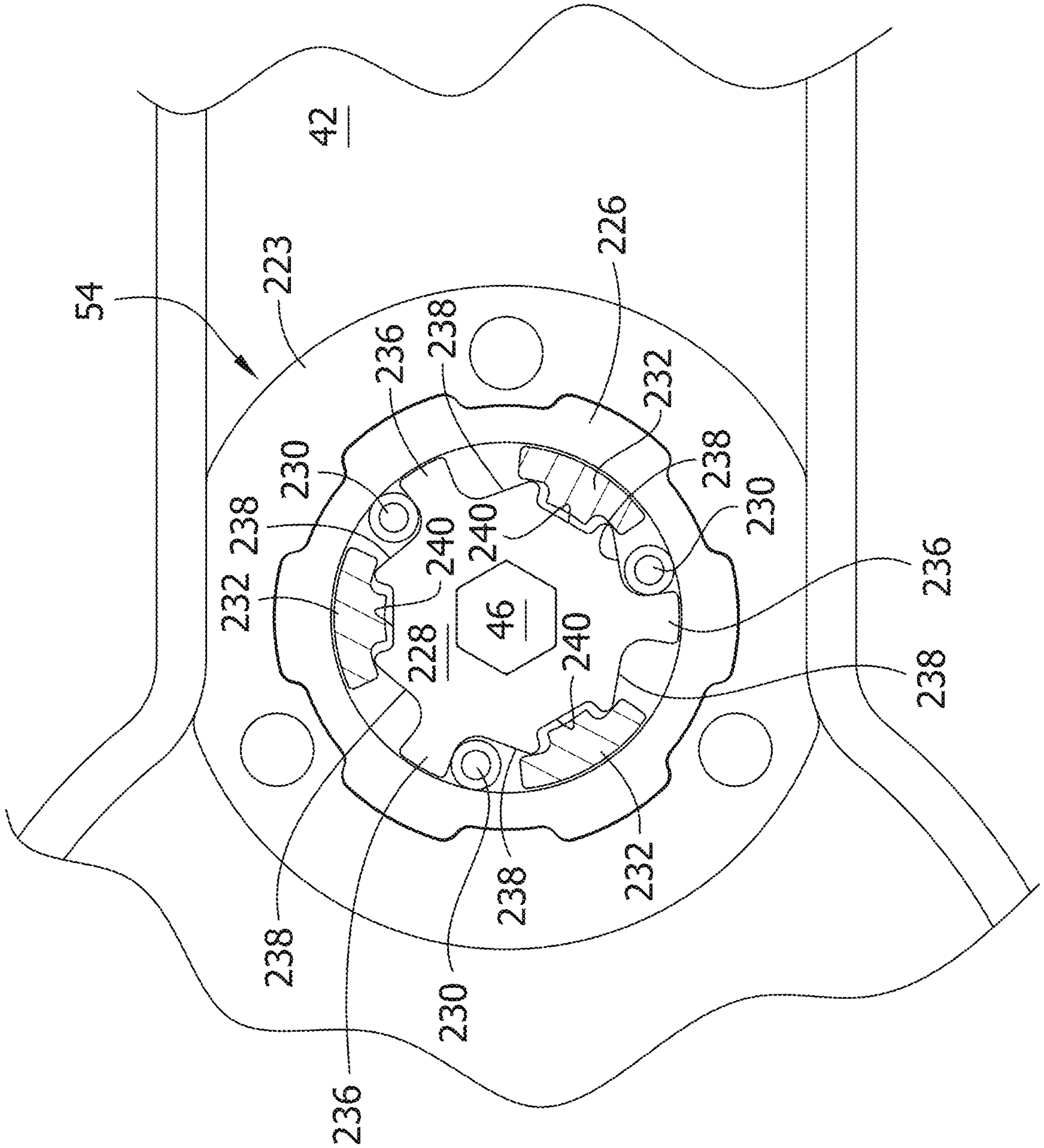
FIG. 18 is a top plan view of the clutch mechanism of FIG. 17.

Referring to FIGS. 4-6, the actuator mechanism 16 includes a drive assembly, generally indicated at 38, and a transmission assembly (e.g., a gear box), generally indicated at 40, operatively connected to the drive assembly. The transmission assembly 40 is contained within a transmission housing 42, and a portion of the drive assembly 38 extends outside the transmission housing. The drive assembly 38 includes a rotatable input shaft 46, a knob 48 accessible outside the transmission housing 42, and a clutch mechanism, generally indicated at 54, which operatively connects the knob to the input shaft to transmit torque from the knob to the input shaft. (More details of the clutch mechanism are shown in FIGS. 17 and 18 and disclosed below herein.) The knob 48 and input shaft 46 are rotatable about a common input axis A1 (FIGS. 2 and 3). The knob 48 is configured to be grasped by a user (e.g., the subject) and rotated about the input axis A1 to impart rotation of the input shaft 46 about the input axis. It is understood that the input 46 shaft may be operatively connected to a prime mover, such as a motor or engine, for rotating the input shaft, rather than a knob 48 or other components for manual operation of the orthosis 10.

The drive assembly may be of other configurations without departing from the scope of the present invention.

Referring still to FIGS. 4-6, the transmission assembly 40 includes an input gear 56 connected to the input shaft 46, a reduction gear 58, an output shaft 60, and an output gear 62. The input gear 56 is rotatable about the input axis A1, while each of the reduction gear 58, the output shaft 60, and the output gear 62 are rotatable about a common output axis A2 (FIG. 6). In the illustrated embodiment, the output axis A2 is generally parallel to the input axis A1, although the axes may be in other orientations relative to one another. The input gear 56 is connected to an end of the input shaft 46 and rotates with the input shaft about the input axis A1. In turn, the input gear 56 is operatively connected to (i.e., in meshing engagement with) the reduction gear 58 for driving rotation of the reduction gear about the output axis A2. One end of the output shaft 60 is secured to the reduction gear 58 and the other end is secured to the output gear 62 so that rotation of the reduction gear about the output axis A2 imparts axial rotation of the output shaft, which in turn imparts axial rotation of the output gear. The reduction gear 58 is configured to reduce the rotational speed transmitted from the input gear 56 to the output gear 62, while at the same time increasing the torque transmitted from the input gear to the output gear. In the illustrated embodiment, the reduction gear 58 has a larger diameter (and more teeth) than the input gear 56, thus making a simple, single-stage gear reduction system. It is understood that the transmission mechanism may be of other configurations or the transmission mechanism may be omitted from the orthosis 10 without departing from the scope of the present invention.

Figure 11:
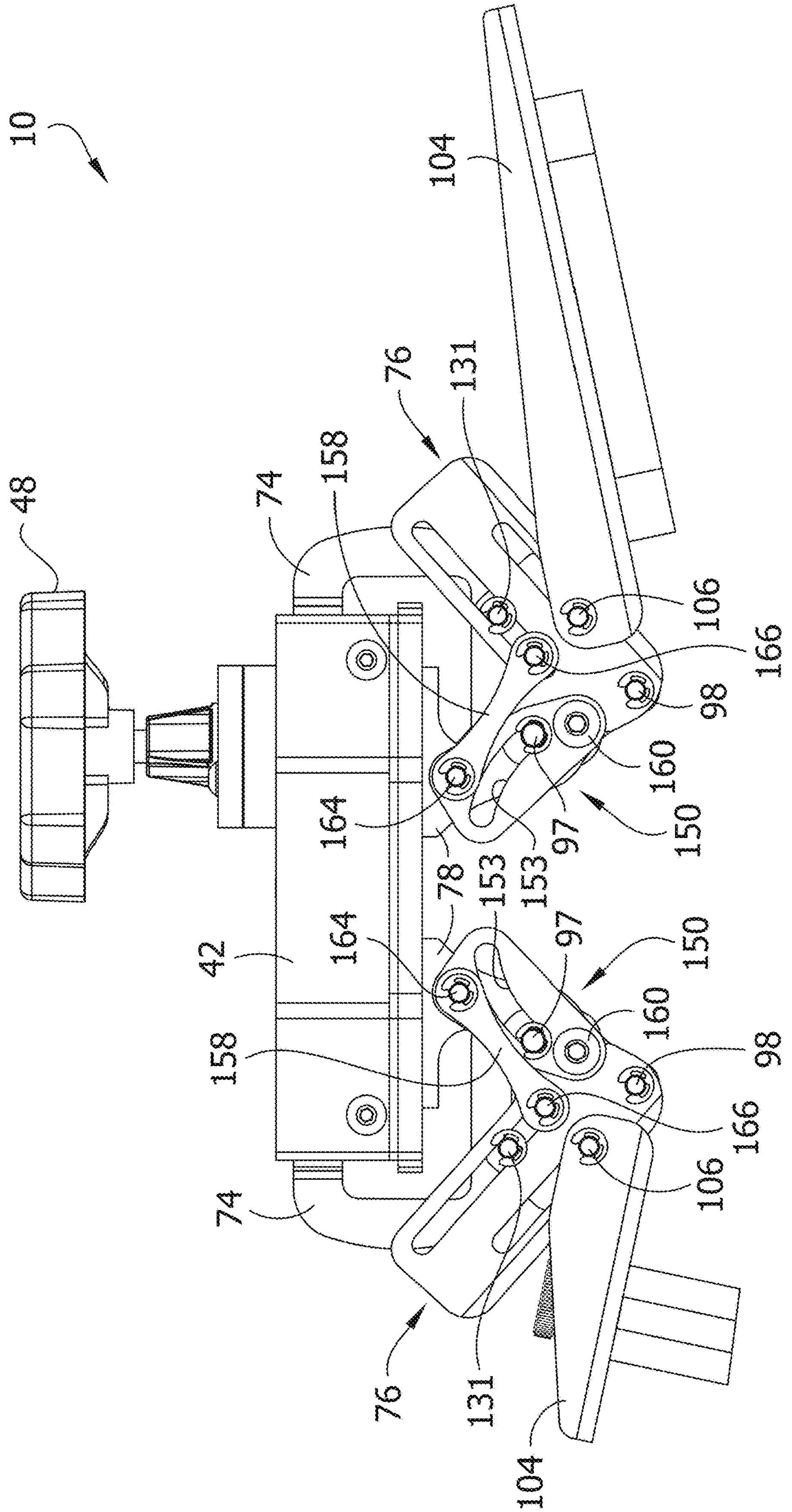
FIGS. 11-16 are front elevations of the orthosis in different flexion positions.
Figure 12:
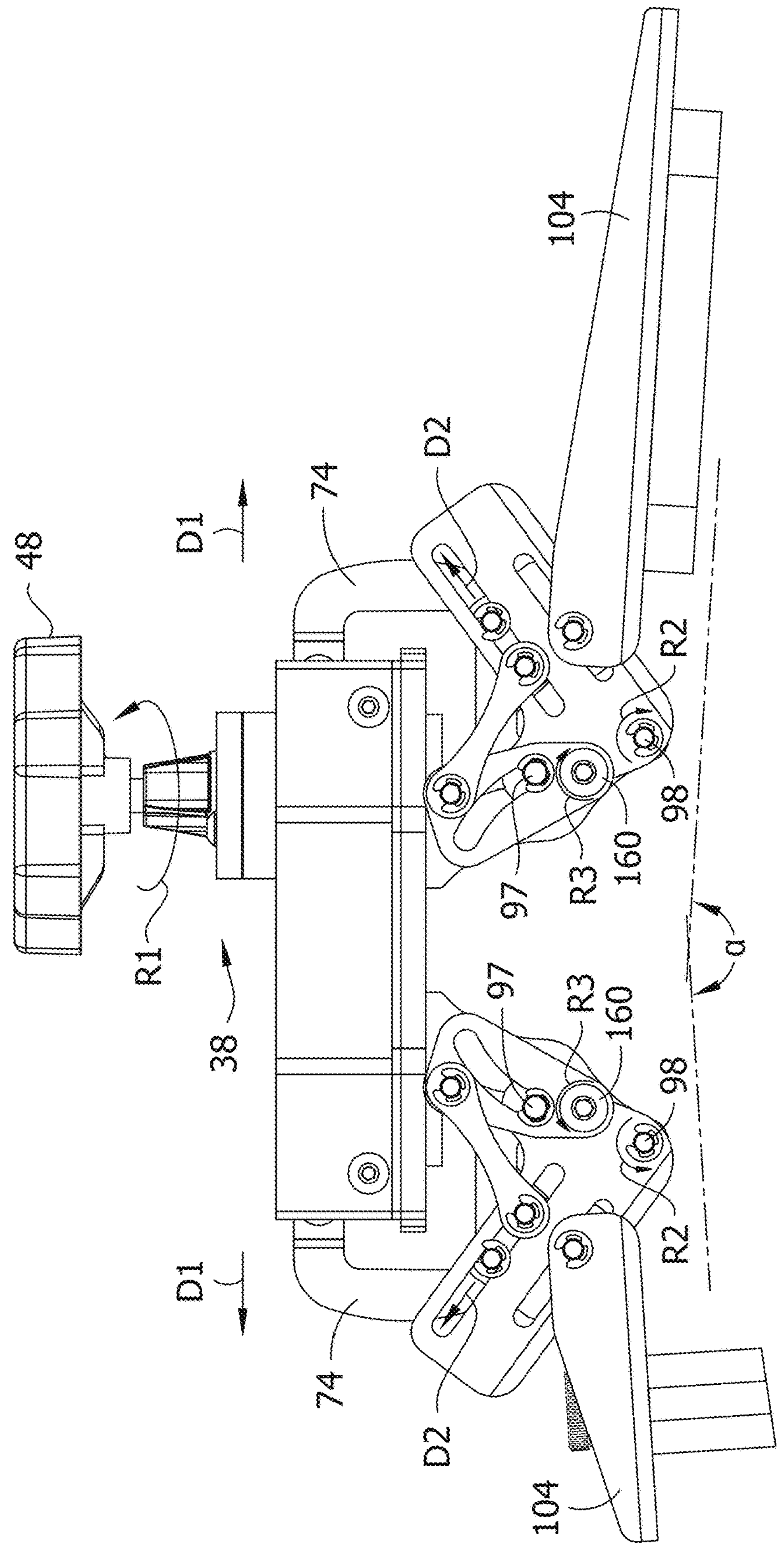

Referring to FIGS. 6-9, each of the first and second linkage mechanisms 20, 22 includes a sliding link 72, a yoke link 74, a bell crank link, generally indicated at 76, and a fixed link 78. The first and second linkage mechanisms may be of similar construction, although dimensions of the components of the respective linkage mechanisms may be slightly different depending on the body joint to be treated. As shown in FIGS. 4-6, in the illustrated embodiment, the sliding link 72 of each of the first and second linkage mechanisms 20, 22 is operatively connected to the output gear 62 of the transmission assembly 40. In particular, each of the first and second sliding links 72 are in meshing engagement with the output gear 62 to form a dual rack and pinion mechanism, whereby the sliding links are configured as racks and the output gear is configured as a pinion. The sliding links 72 are slidably received in the transmission housing 42 such that linear sets of teeth 82 extending along the respective sliding links are in opposing relationship and the output gear 62 (i.e., the pinion) is disposed between the linear sets of teeth. Rotation of the output gear 62 (i.e., the pinion) about the output axis A2, as driven by rotation of the knob 48, imparts linear movement of the first and second sliding links 72 in opposite directions. In particular, as shown in FIG. 12, rotation of the knob 48 in a first direction (e.g., clockwise; as indicated by arrow R1) about the input axis A1 moves the sliding links 72 along linear paths in opposite first directions, as indicated by arrows D1, and as shown in FIG. 11, rotation of the knob in a second direction (e.g., counterclockwise) about the input axis moves the sliding links along linear paths in opposite second directions. As explained in more detail below, rotation of the knob 48 in the direction R1 imparts movement of the cuffs 24, 26 in the flexion direction, while rotation of the knob in the opposite direction imparts movement of the cuff in the extension direction. Accordingly, the illustrated actuator mechanism 16 is configured as a linear actuator mechanism which converts rotational movement (e.g., rotation of the knob 48) into linear movement of the first and second sliding links 72. The sliding links 72 extend out of opposite ends of the transmission housing 42 through respective first and second openings, 86, 88.

The first and second yoke links 74 are secured to ends of the respective first and second sliding links 72 that are outside the transmission housing 42. In the illustrated embodiment, the yoke links 74 are fastened (e.g., bolted) to the respective first and second sliding links 72, although it is understood that the yoke links may be integrally formed with the first and second sliding links. By making the yoke links 74 separate from the sliding links 72, yoke links with different sizes/configurations can be interchangeable on the orthosis 10 to accommodate different body joint sizes and/or different body joints. Each of the yoke links 74 defines a slot-shaped opening 90 having a length extending generally transverse (e.g., orthogonal) to the lengths and linear paths of the respective first and second sliding linkages 20, 22.

Figure 7:
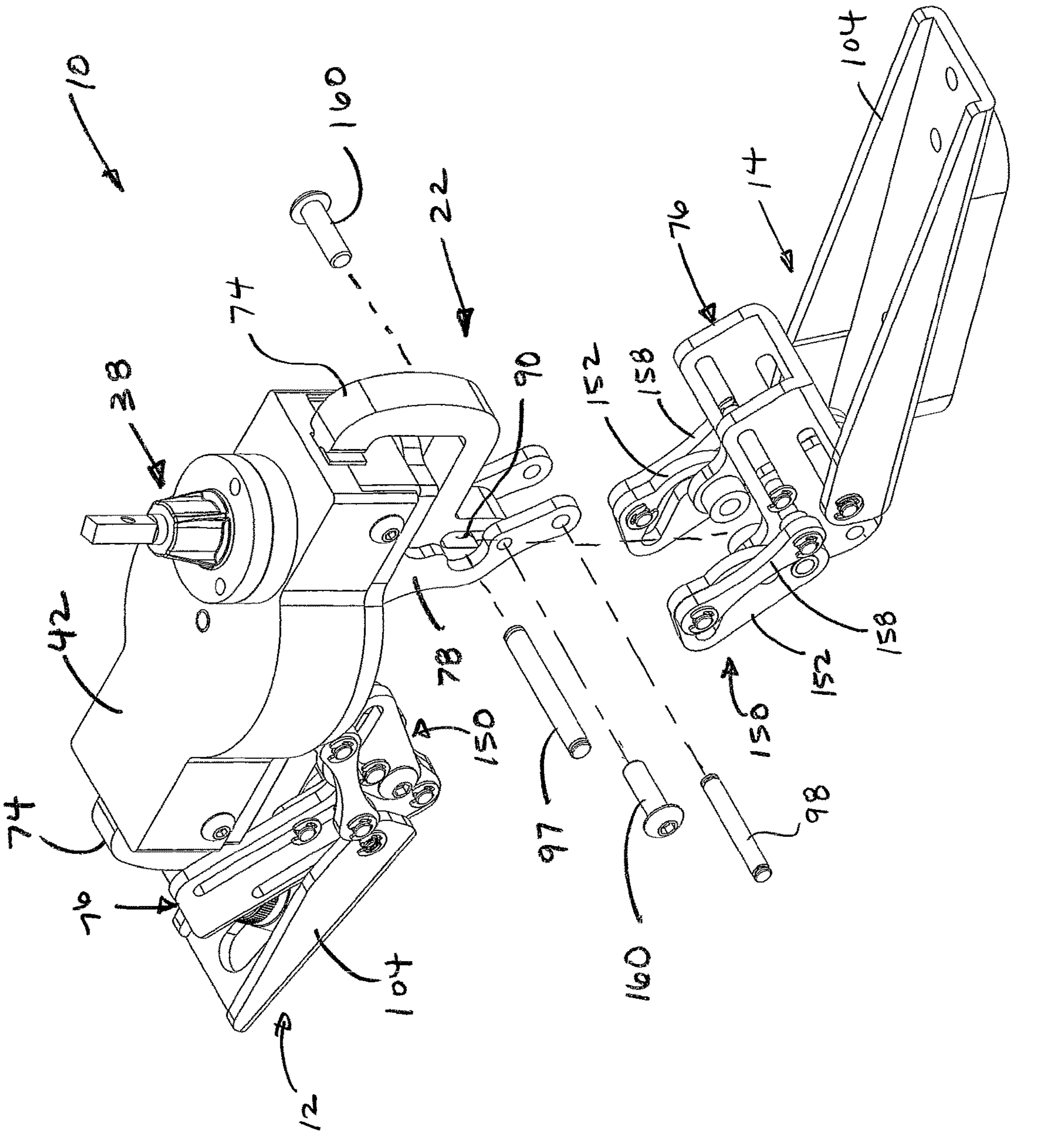
FIG. 7 is an exploded view of the orthosis showing a bell crank link exploded from remainders of the linkage mechanism.
Figure 9:
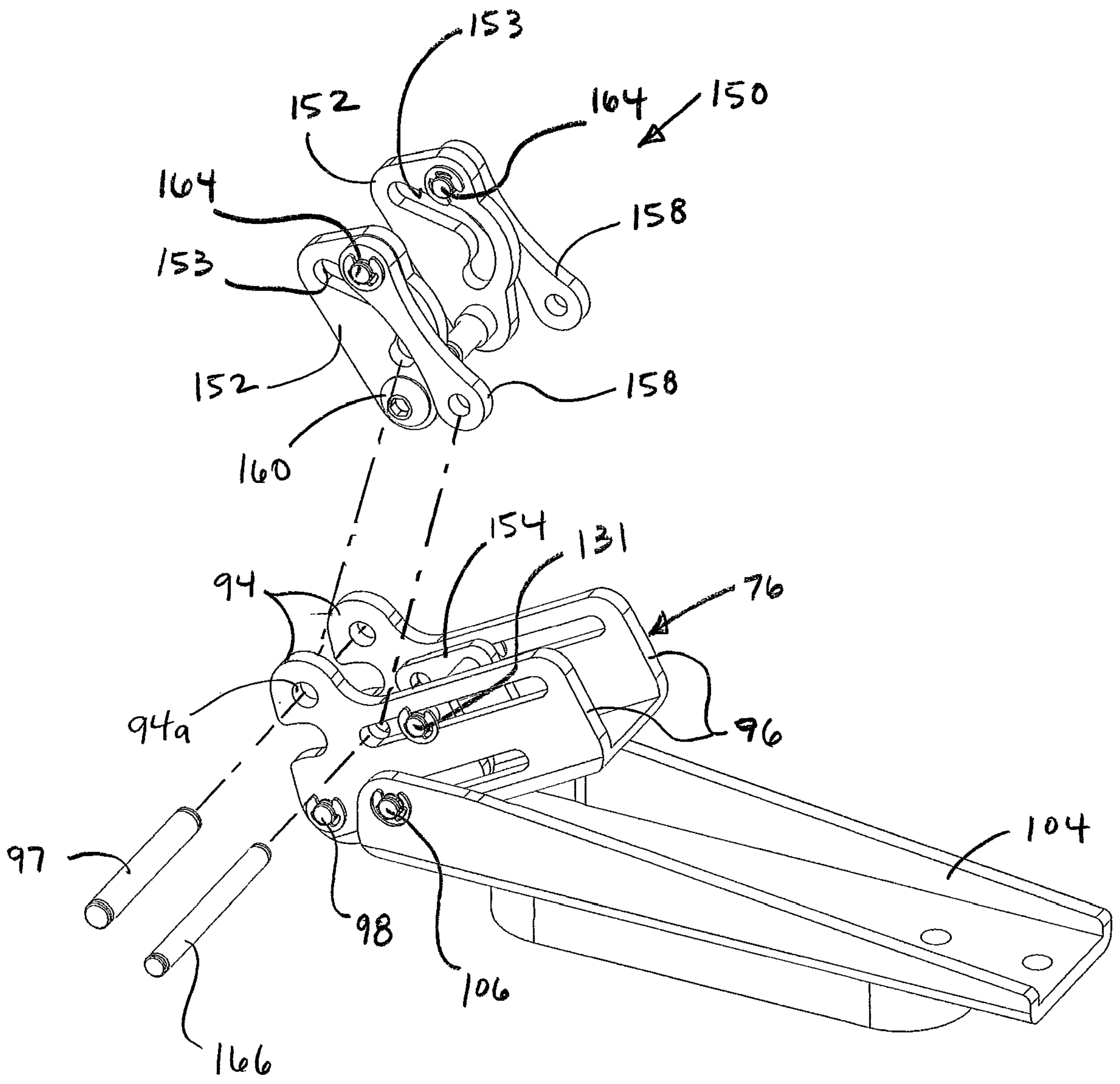
FIG. 9 is a perspective FIG. 8 with a portion of the slider-crank mechanism exploded therefrom.

The first and second bell crank links 76 of the respective first and second linkage mechanisms 20, 22 have a first crank arm 94 (e.g., a pair of first crank arms) operatively (i.e., slidingly) connected to the corresponding yoke link 74, and a second crank arm 96 (e.g., a pair of second crank arms) extending outward from the first crank arm in a direction generally transverse to a length of the first crank arm. Referring to FIGS. 7 and 9, yoke pins 97 are received in the slot-shaped openings 90 of the corresponding yoke links 74 and in openings 94*a* in the first crank arms 94 to slidably secure terminal ends of the first crank arms to the yoke links, thereby allowing sliding movement of the bell crank links 76 relative to the corresponding yoke links. The first and second bell crank links 76 are rotatably (e.g., pivotably) attached to terminal ends of the respective first and second fixed links 78 generally adjacent junctions of the first and second crank arms 94, 96. In particular, fixed link pins 98 pivotably connect the first and second bell cranks 76 to the respective first and second fixed links 78 so that the bell crank links are rotatable about the fixed link pins. Rotation of the knob 48 (e.g., operation of the actuator assembly 16) imparts rotation of the first and second bell crank links 76 about the fixed link pins 98 to adjust an angular position of the first and second cuffs 24, 26 relative to one another to facilitate extension and/or flexion of the body joint, as described below.

Figure 8:
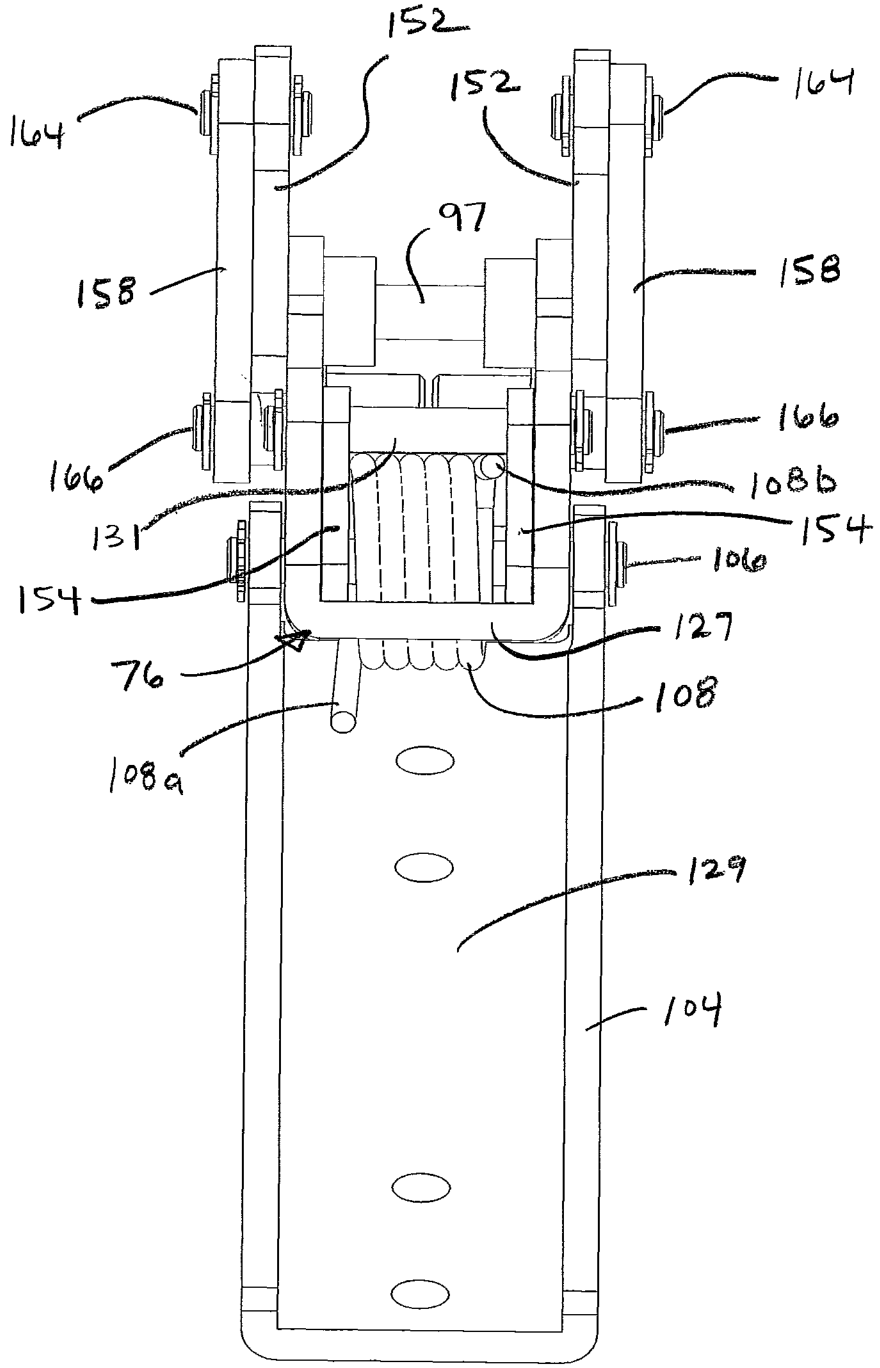
FIG. 8 is a side elevation of one of the bell crank links and associated dynamic force mechanism and slider-crank mechanism.
Figure 10:
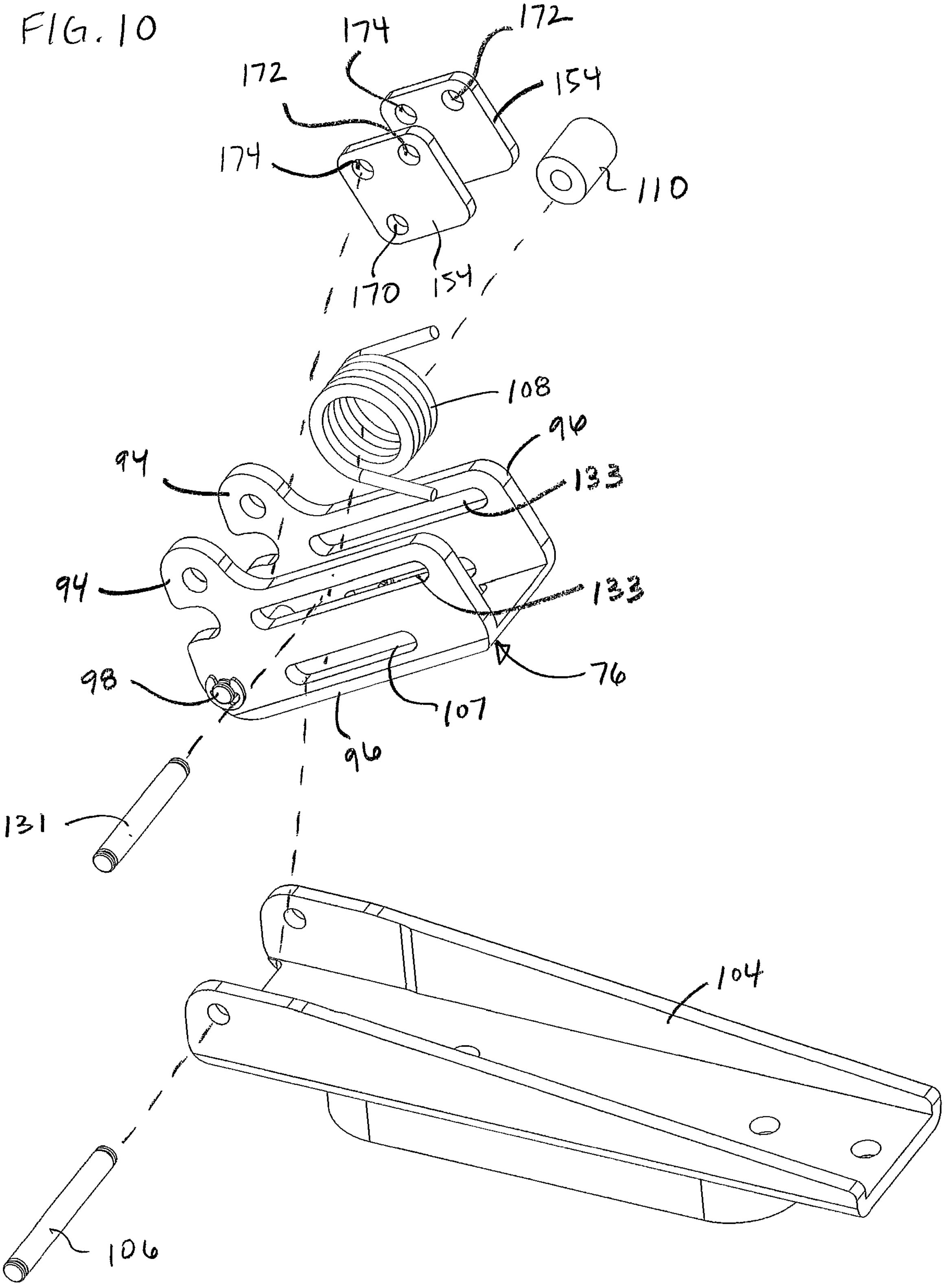
FIG. 10 is an exploded view of the orthosis showing the dynamic force mechanisms exploded from the respective linkage mechanisms.

Referring to FIGS. 8-10, the first and second dynamic force mechanisms 12, 14 are operatively connected to the respective first and second bell cranks 76. In the illustrated embodiment, the dynamic force mechanisms 12, 14 include lever arms 104—pivotably connected to the corresponding one of the bell cranks 76 by a lever pivot pin 106 functioning as a fulcrum—and resilient force elements 108. The lever pivot pin 106 passes through openings in the lever arm 104 and a lower slot 107 (e.g., pairs of lower slots) in the second crank arm 96 (e.g., the pair of second crank arms) of the bell crank 76. As explained in more detail below, the first and second dynamic force mechanisms 12, 14 translate along the bell cranks 76 (i.e., along the second crank arms 96 of the bell cranks) to adjust the position of the dynamic force mechanisms 12, 14 relative to the respective bell cranks during operation of the orthosis 10.

The force elements 108 apply forces to the respective levers 104 to pivot the levers about the lever pivot pins 106 and relative to the respective bell crank links 76 (more specifically, the second crank arms 96 of the bell cranks). In the illustrated embodiment, the force elements 108 comprise springs (e.g., torsion springs) mounted on corresponding bell crank links 76. In particular, each force element 108 is received on a spring spool or mount 110, and the spring spool is secured to the corresponding bell crank link 76 by passing the lever pivot pin 106 through the spool. Because orthosis 10 is configured for increasing range of motion of a body joint in flexion, the first and second dynamic force mechanisms 12, 14 are configured such that the force elements 108 (e.g., torsion springs) apply torques to the respective lever arms 104 to pivot the lever arms about the lever pivot pins 106 and relative to the respective bell crank links 76 (more specifically, the second crank arms 96 of the bell crank links) in a biased direction to a flexed position. To this end, each spring 108 is mounted on the corresponding bell crank link 76 using the spring spool 110 and the lever pivot pin 106. A first spring arm **108*a* of the torsion spring 108 engages a floor 118 of the corresponding lever arm 104 and a second spring arm 108*b* engages the second crank arm 96 of the corresponding bell crank link 76. In particular, the first spring arm 108*a* extends through an opening in the floor 120 of the second crank arm 96 and engages the floor 118 of the lever arm 104 to apply a spring force to the lever arm. The second spring arm 108*b* engages a counterforce rod 131 secured to the second crank arm 96. As explained in more detail below, the counterforce rod 131 is slidably received in an upper slot 133 (e.g., a pair of upper slots) extending along the second crank arm (e.g., the pair of second crank arms) of the bell crank link 76**.

Figure 14:
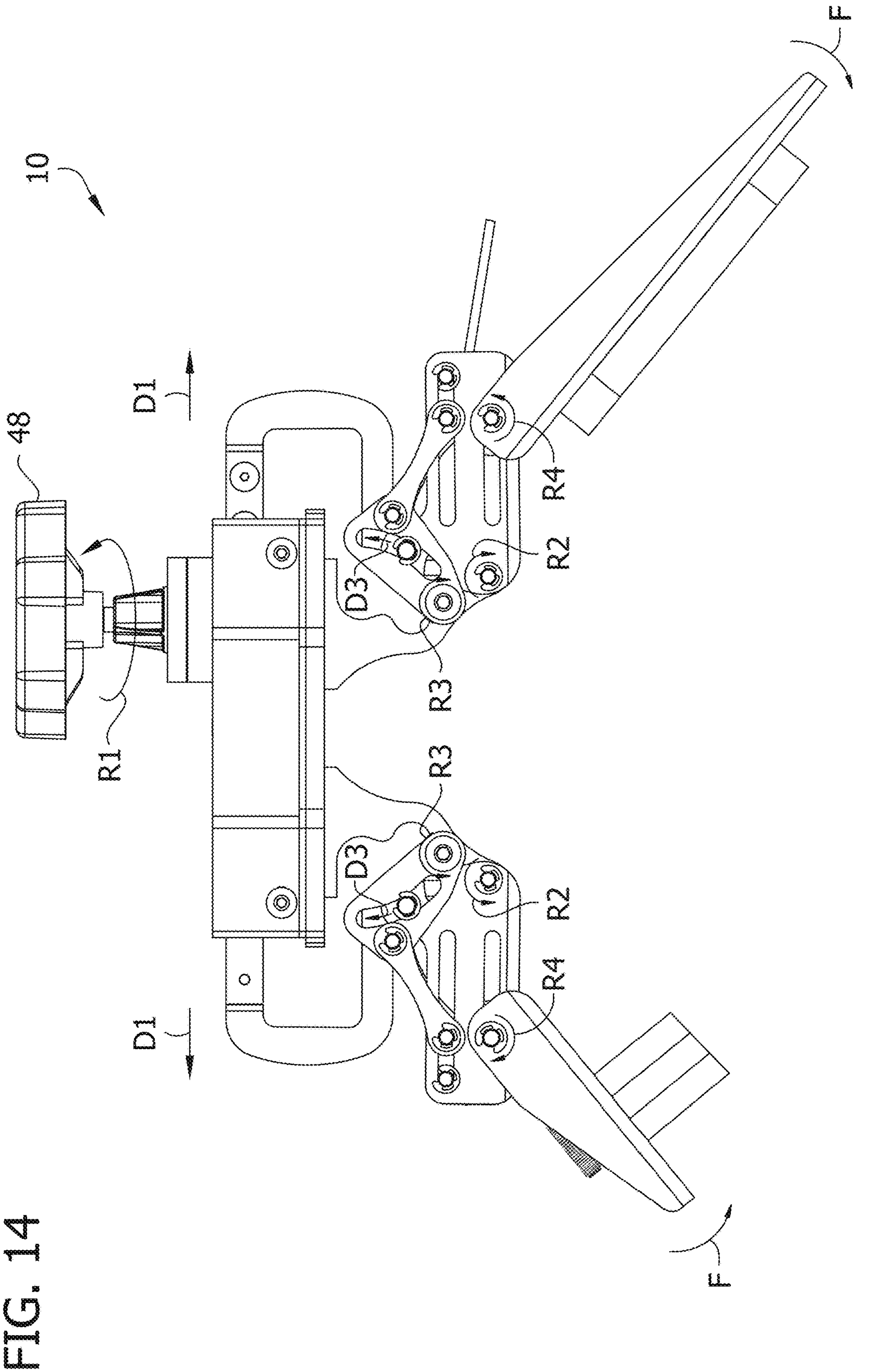
Figure 15:
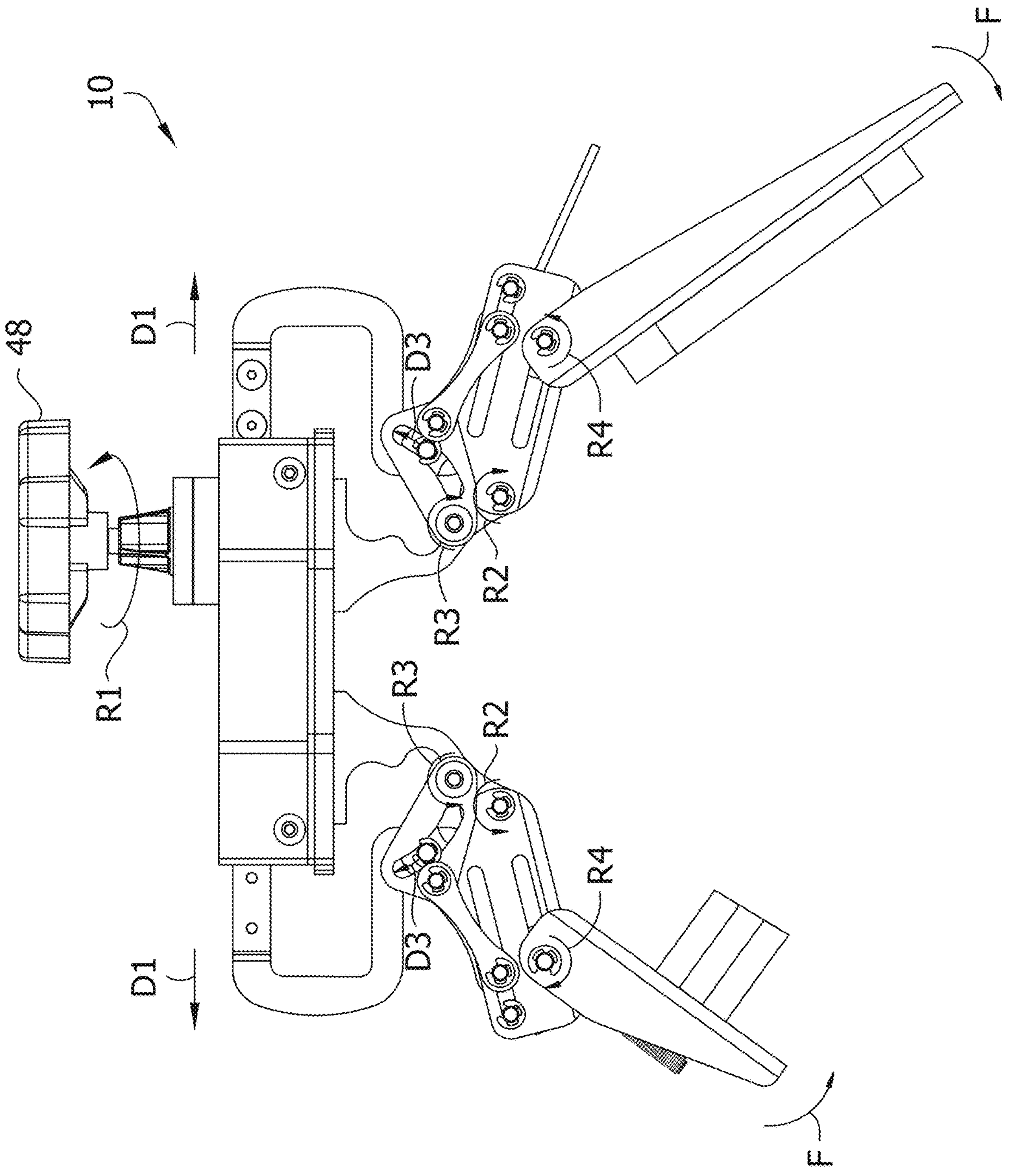

From extended positions, each lever arm 104 is pivotable against the force of the corresponding spring 108 in a load direction, as indicated by arrows R4 in FIGS. 14 and 15, about the lever pivot arm 106 away from one another and toward the corresponding second crank arms 96 to collapsed positions. Pivoting of the lever arms 104 about the lever pivot pins 106 adjusts the included angle between the cuffs 24, 26 (and the lever arms), independent of movement of the linkage mechanisms 20, 22 and the actuator mechanism 16, and loads the springs 108 to apply a dynamic torque to the body joint in the flexion direction. Thus, pivoting of the lever arms 104 also adjusts the angular position of the first and second cuffs 24, 26 relative to one another to facilitate extension and/or flexion of the body joint, independent of movement of the linkage mechanisms 20, 22 and the actuator mechanism 16.

Referring to FIGS. 2, 3, and 9, as disclosed above, the first and second dynamic force mechanisms 12, 14 translate along the bell cranks 76 (i.e., along the second crank arms 96 of the bell cranks) to adjust the position of the dynamic force mechanisms relative to the respective bell cranks. To this end, the orthosis 10 includes slider-crank mechanisms (e.g., two slider-crank mechanisms associated with each cuff), each generally indicated at 150, configured to adjust the positions of the dynamic force mechanisms 12, 14 relative to respective bell cranks during operation of the orthosis. Each slider-crank mechanism 150 comprises a cam 152 (functioning as the crank) defining a curvilinear groove 153, a slider 154, and a connecting rod or link 158 pivotably connected to and interconnecting the cam and the sliding plate. In the illustrated embodiment, each slide-crank mechanism 150 comprises two sets of cams 152, sliders 154, and connecting links 158. Each cam 150 is pivotably connected to one of the fixed links via a cam pin 160 extending through a first end of the cam. Each yoke pin 97 extends through the curvilinear grooves 153 of one of the sets of cams 152, whereby the yoke pin connects the yoke link 74 to the bell crank 76 and the corresponding cams 152. A first end of each connecting link 158 is pivotably connected to the corresponding cam 152 via a connecting link pin 164 extending through a second end of the cam opposite the first end. A second end of each connecting link 158 is pivotably connected to the corresponding slider 154 via a slider pin 166. Each slider 154 comprises a slider plate through which the lever pivot pin 106 and the counterforce rod 131 of the corresponding dynamic force mechanism 12, 14 also extend. In particular, each lever pivot pin 106 extends through the lever arm 104, the lower slots 107 of the corresponding bell crank 76, and lower openings 170 of the respective sliders 154. Each counterforce rod 131 extends through the upper slots 133 of the corresponding bell crank 76 and first upper openings 172 of the respective sliders 154. Each slider pin 166 extends through the upper slots 133 of the corresponding bell crank 76 and second upper openings 174 of the respective sliders 154. The slider pin 166 and the counterforce rod 131 are slidable along the corresponding set of upper slots 133, and the lever pivot pin 106 is slidable along the corresponding set of lower slots 107. Accordingly, each set of slider plates 154 is slidable along the second crank arm 96 of the corresponding bell crank link 76 and connects the connecting link 158 to the corresponding dynamic force mechanism 12, 14 such that movement of the connecting link imparts sliding, linear movement (e.g., translation) of the dynamic force mechanism (and the corresponding cuff 24, 26) relative to and along the second crank arm.

As disclosed above, the configuration of the orthosis 10 is suitable for increasing range of motion of a body joint in flexion. In an exemplary method of use, a first body portion is secured to the first cuff 24 and a second body portion on an opposite side of a joint, for example, is secured to the second cuff 26. As a non-limiting example, in the embodiment illustrated in FIG. 2, a hand can be secured to the first cuff 24 and a forearm or lower arm portion can be secured to the second 26 cuff for treating a wrist joint in flexion. In the illustrated embodiment, the body portions are secured to the cuffs using the straps 29, 34 and the hook and loop fasteners on the straps. With the body portions are secured to the respective cuffs 24, 26 (or before the body portions are secured), the subject flexes the body joint to a desired, initial position in flexion, such as a position recommended by a healthcare professional and/or to a maximum initial position in flexion to which the subject can move the body joint. In another example, the desired initial rotational position of the bell cranks may be set by operating the knob.

Figure 13:
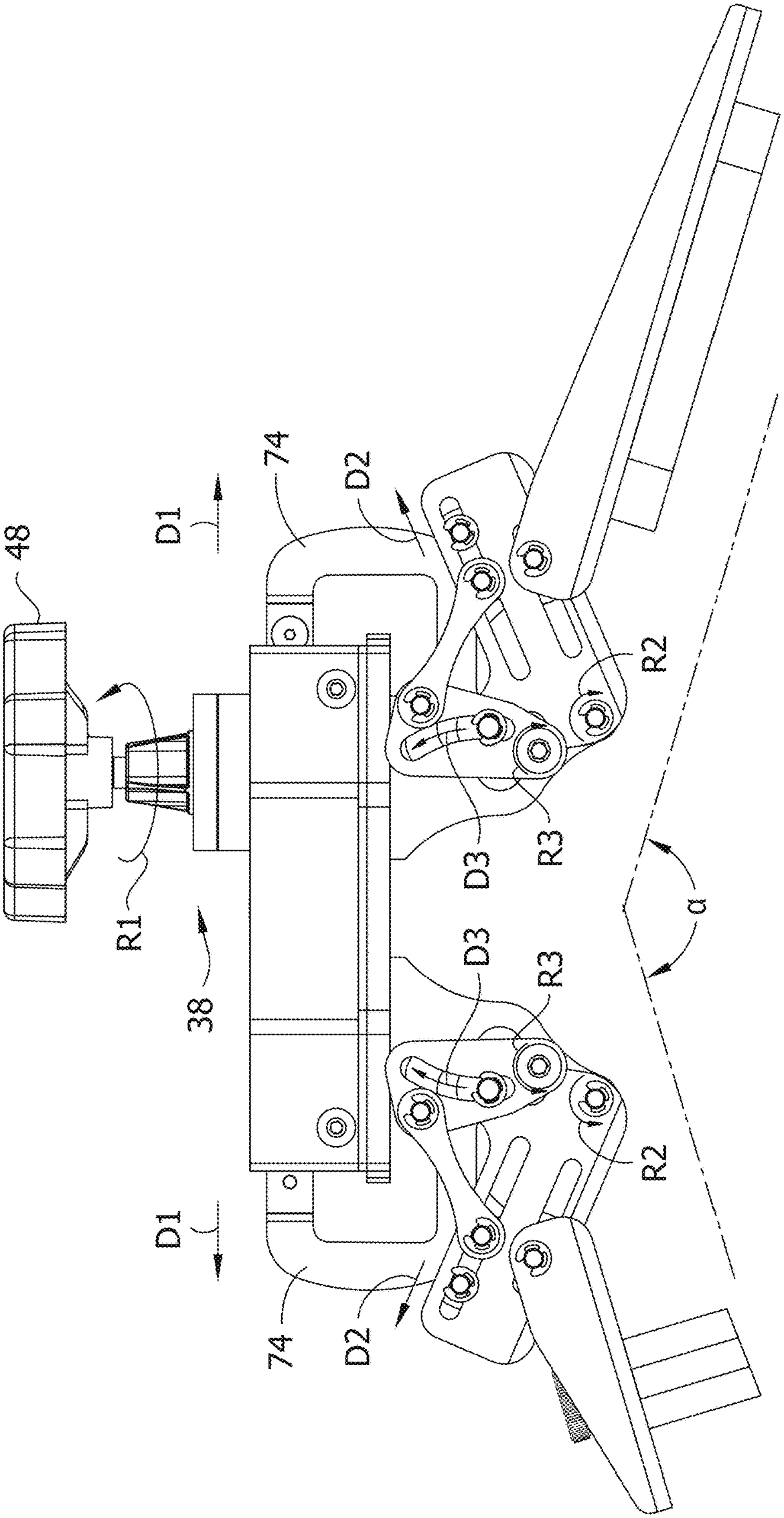

Referring to FIG. 11, an exemplary initial position of the orthosis 10 is shown. Referring to FIG. 12, with the body portions secured to the orthosis and the body joint in the desired, initial position in flexion, the knob 48 is rotated in the first direction R1 (e.g., the counterclockwise direction as viewed in FIG. 12). In operation, rotation of the knob 48 imparts rotation of the input shaft 46 and the input gear 56 about the input axis A1. Rotation of the input gear 56 imparts rotation to the reduction gear 58, thus imparting rotation to the output gear 62 (i.e., the pinion). Rotation of the pinion 62 in turn imparts linear movement of the first and second sliding links 72 such that the yoke links 74 move in a linear direction D1 away from one another and away from the transmission housing 42. Movement of the yoke links 74 in the linear direction D1 drives movement of the yoke pins 97 to impart rotation of the bell cranks 76 about the fixed link pins 98 in the rotational direction R2 and to impart rotation of the cams 152 about the cam pins 160 in the rotational direction R3. When there is insufficient or no counterforce acting on the lever arms 104 and cuffs 24, 26 to overcome the biasing force of the springs 108, the rotation of the bell cranks 76 imparts rotation of the lever arms and cuffs toward one another to decrease the included angle α between axes of the cuffs (i.e., the flexion direction), as shown in FIGS. 12 and 13. Rotation of the cam 152 about the cam pin 160 in the rotational direction R3 imparts linear, sliding movement of the sliders 154 and the dynamic force mechanisms 12, 14, along the respective second crank arms 96 away from the first crank arms 94 in the linear direction D2. The connecting links 158 are rotatably connected to the cams 152 and the sliders 154 and thus rotate about the pins connecting link pin 164 and the slider pin 166 relative to the respective cams and sliders. Referring to FIG. 13, continued rotation of the knob advances rotation of the bell cranks 76 in the direction R2, rotation of the cams 152 in the direction R3, and linear movement of the dynamic mechanisms 12, 14 along the bell cranks in the direction D2. Moreover, the slider pins 166, the counterforce rods 131, and the lever pivot pins 106 slide along the respective upper and lowers slots 133, 107 of the cams in the direction D2.

Referring to FIG. 14, at some point in the range of motion in flexion of the body joint (e.g., at the initial flexion position of the body joint or some increase flexion position), rotation of the bell cranks 76 in the flexion direction does not impart further flexion of the body joint because the stiffness of the body joint overcomes the biasing force of the springs 108. Accordingly, further rotation of the bell cranks 76 in the flexion direction moves the second crank arms 96 of the bell cranks toward the lever arms 104 and the cuffs 24, 26 secured to the lever arms (e.g., relative pivoting of the lever arms and cuffs in the direction R4), as the lever arms and the cuffs stay with the body portions. As the second crank arms 96 of the bell cranks 76 pivot toward the lever arms 104 in the direction R4 about the lever pivot pins 106, the springs 108 elastically deform (e.g., compress) on the spring mounts 110. Elastic deformation of the springs 108 (not shown) produces a dynamic force F on the lever arms 104 in the flexion direction biasing the lever arms away from the corresponding second crank arms 96 of the bell cranks 76, which in turn, produces a biasing dynamic force of the spring on the body portions in the flexion direction. Further pivoting of the bell cranks 76 by turning the knob 48 decreases the angular distance between the second cranks arms 96 and the corresponding lever arms 104, thereby increasing the dynamic force F of the spring 108 imparted on the body portions in the extension direction. The bell cranks 176 are pivoted to a suitable treatment position in which the biasing forces of the springs 108 are constantly applied to both sides of the body joint in the flexion direction. The application of this biasing force F utilizes the principles of creep to continuously stretch the joint tissue during a set time period (e.g., 4-8 hours), thereby maintaining, decreasing, or preventing a relaxation of the tissue.

Figure 16:
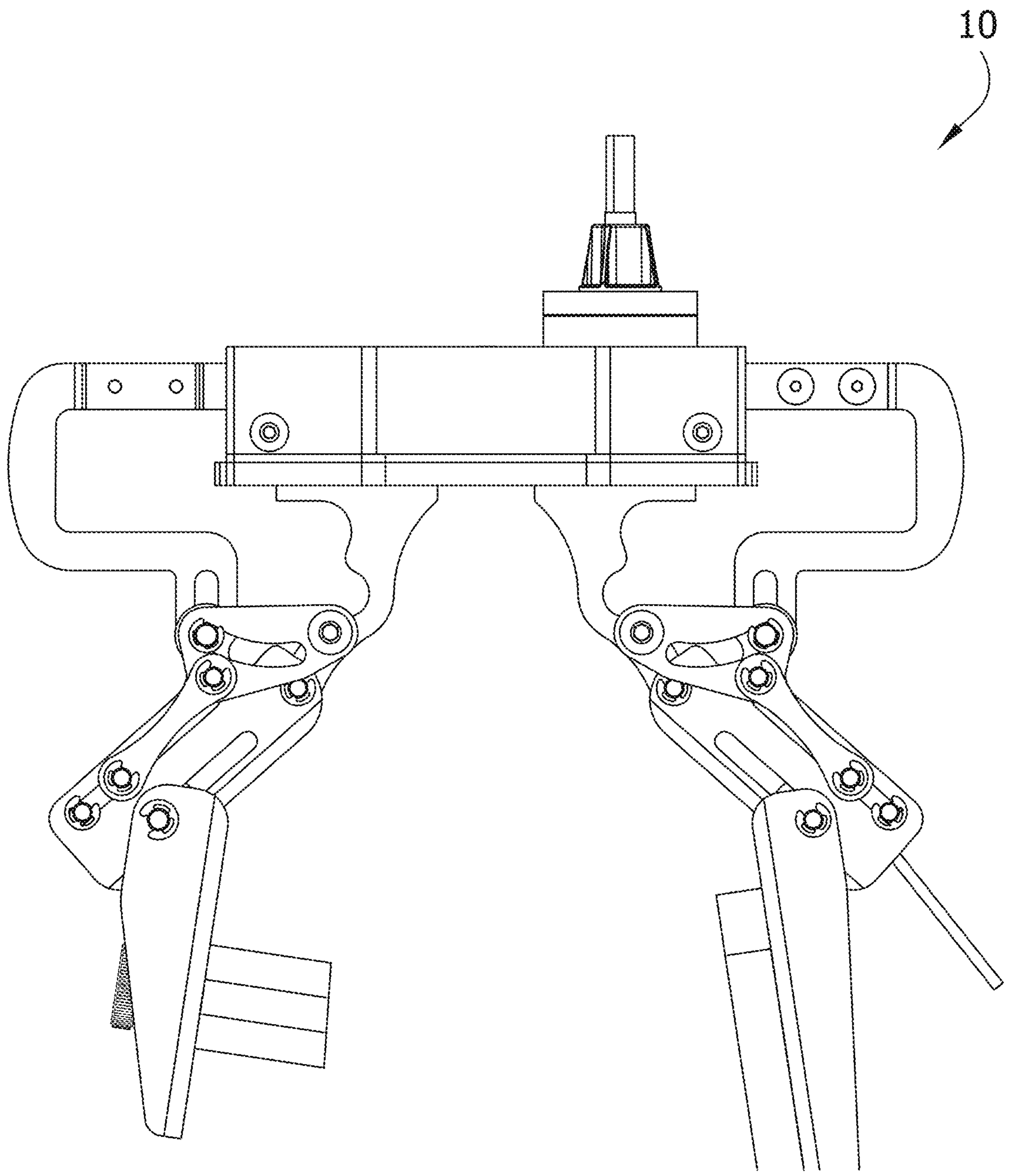

Referring still to FIG. 14, at some point in the range of motion in flexion of the body joint, the sliders 154 and the dynamic force mechanisms 12, 14 reach the end of the slots 133 in the second crank arms 96. At this point, further rotation of the knob 48 and thus further linear movement of the yoke links 74 in the direction D1 does not impart linear movement of the sliders 154 and the dynamic force mechanisms 12, 14. However, as shown in FIG. 15, further rotation of the knob 48 and thus further linear movement of the yoke links 74 in the direction D1 imparts continued rotation of the bell cranks 76 and the cams 152, and imparts continued movement of the yoke pins 97 in the grooves 153 of the cams. Referring to FIG. 16, at some point in the range of motion in flexion, the orthosis 10 is incapable of imparting further rotation to the bell cranks 76, and thus the orthosis has reached its end of range of motion in flexion.

Referring to FIG. 17, the illustrated orthosis 10 further includes an anti-back off mechanism for inhibiting the movement of the bell cranks 76 in at least one of the extension direction and the flexion direction independent of the drive assembly 38. In other words, the anti-back off mechanism inhibits the bell cranks 76 from rotating about the respective fixed link pins 98 in at least one of the extension direction and the flexion direction without operating the drive assembly. As set forth above, the illustrated embodiment is configured to increase range of motion of a body joint in flexion. For reasons explained in more detail below when discussion the use of the illustrated orthosis 10, the anti-back off mechanism of this embodiment is configured to inhibit rotation of the bell cranks 76 in at least the extension direction independent of the drive so that the positions of the bell cranks 76 in flexion are maintained against a force imposed by the body joint biasing the bell cranks 76 in the extension direction when the body portions are secured to the cuffs 24, 26. In addition, the illustrated anti-back off mechanism is configured to allow rotation of the bell cranks 76 in the flexion direction independent of the drive. This allows the positions of the bell cranks 76 (and the cuffs) in extension to be quickly set without operating the drive 38. In other embodiments, the anti-back off mechanism may be configured to inhibit movement of the bell cranks in both extension and flexion directions.

In the illustrated embodiment, the anti-back off mechanism is integrated with the drive assembly, although in other embodiments the anti-back off mechanism may be integrated or associated with other components of the orthosis 10, including but not limited to the transmission mechanism and/or the linkage mechanism. The illustrated anti-back off mechanism comprises the clutch mechanism. Referring to FIGS. 17 and 18, the clutch mechanism is a unidirectional clutch mechanism (broadly, a one-way anti-rotation device), interconnecting the knob 48, via a knob shaft 222, to the input shaft 46. The unidirectional clutch mechanism is contained within a clutch housing 123 connected to the transmission housing 42. The clutch mechanism includes a hub 224 secured to the knob shaft 222, an outer race 226 fixedly secured to the transmission housing 42, an inner race 228 (e.g., two inner race pieces) disposed in the outer race and fixedly connected to the input shaft 42, and rollers 230 (e.g., cylinders) between the inner and outer races. The inner race 228 is rotatable within the outer race 226 about the input axis A1. The hub 224 includes fingers 232 (e.g., three fingers) spaced apart about the input axis A1 for connecting the hub 224 to the inner race 228. The inner race 228 includes radially extending stops 236 (e.g., three stops) spaced apart about the input axis. Disposed between adjacent stops are first and second roller notches 238 adjacent the respective stops, and a finger notch 240 adjacent intermediate the roller notches. A rib on each of the hub fingers 232 is slidably received in a corresponding one of the finger notches 240 to connect the hub 224 to the inner race 228. The rollers 230 are received in one of the first and second roller notches, as shown in FIG. 18. In another embodiment, illustrated in FIGS. 17A, 18A, rollers 230 are received in the roller notches 238 on each side of each hub finger 232.

Referring to FIG. 18, in operation, the unidirectional clutch allows transmission of torque from the knob 48 to the input shaft 46 when the knob is rotated in either direction. As torque is applied to the hub 224 by rotating the knob 48, the hub fingers 232 transmit the torque to the inner race 228. In the illustrated embodiment, where the rollers 230 are received in the first roller notches 238, torque applied to the hub 224 in a first direction imparts rotation to the inner race 228, whereby the stops 236 move toward and engage the rollers to move the rollers along the inner wall of the outer race 226 and rotate the inner race and the input shaft 46 about the rotational axis A1. Torque applied to the hub 224 in the second direction causes the hub fingers to move toward the rollers 230 to move the rollers along the inner wall of the outer race 226 and rotate the inner race 228 and the input shaft 46 about the rotational axis A1. Thus, rotation of the knob 48 in either direction imparts rotation of the input shaft 46 about the rotational axis A1 via the unidirectional clutch.

The unidirectional clutch also allows transmission of torque from the input shaft 46 to the knob 48 in one direction, thereby allowing the bell crank links 76 to pivot about the fixed link pins 98 in one direction without operating the knob 48, and inhibits transmission of torque from the input shaft 46 to the knob in the opposite direction, thereby inhibiting pivoting of the bell crank links about the fixed link pins in the opposite direction without operating the knob. When torque is applied to the input shaft 46 from the linkage mechanism (e.g., torque is applied to the input shaft without operating the knob), the input shaft transmits torque to the inner race 228. In the illustrated embodiment, where the rollers 230 are received in the first roller notches 238, as illustrated, torque applied to the input shaft 46 in a first direction imparts rotation to the inner race 228, whereby the stops 236 move toward and engage the rollers to move the rollers along the inner wall of the outer race 226 and rotate the inner race and the knob 48 about the rotational axis A1. Torque applied to the input shaft 46 in the second direction causes the inner race 228 to move relative to the outer race 226 and independent of the rollers 230. As the inner race moves independent of the rollers, the notched portions of the inner race 228 engage the rollers 230 and push the rollers against the inner wall of the outer race 226 creating interference between the rollers and the outer race, thereby inhibiting relative movement between the inner and outer races. Thus, torque applied to the input shaft 46 in one direction via the linkage mechanism 20, 22 imparts rotation of the inner race 228 relative to the outer race 226, thereby allowing the cuffs 24, 26 to be moved in one direction without operating the knob 48, while torque applied to the input shaft in the opposite direction via the linkage mechanism does not impart rotation of the inner race relative to the outer race, thereby inhibiting movement of the bell cranks 76 (and thus the cuffs) in the opposite direction without operating the knob.

Referring to FIG. 18A, in another embodiment, the anti-back off mechanism is configured to inhibit rotation of the bell cranks 76 in both directions (i.e., in both flexion and extension. The anti-back off mechanism of FIG. 18A is similar to the anti-back off mechanism of FIG. 18. The main difference is that the rollers 230 are received in both the first and second roller notches 238 so that torque applied to the input shaft 46 in either the first direction or the second direction causes the inner race 228 to move relative the outer race 226 and independent of the rollers 230. As the inner race 228 moves independent of the rollers 230, the notched portions of the inner race engage the rollers and push the rollers against the inner wall of the outer race 226, creating interference between the rollers and the outer race and thereby inhibiting relative movement between the inner and outer races. Thus, the knob 48 must be operated to rotate the bell crank links 276 in either direction.

Figure 19:
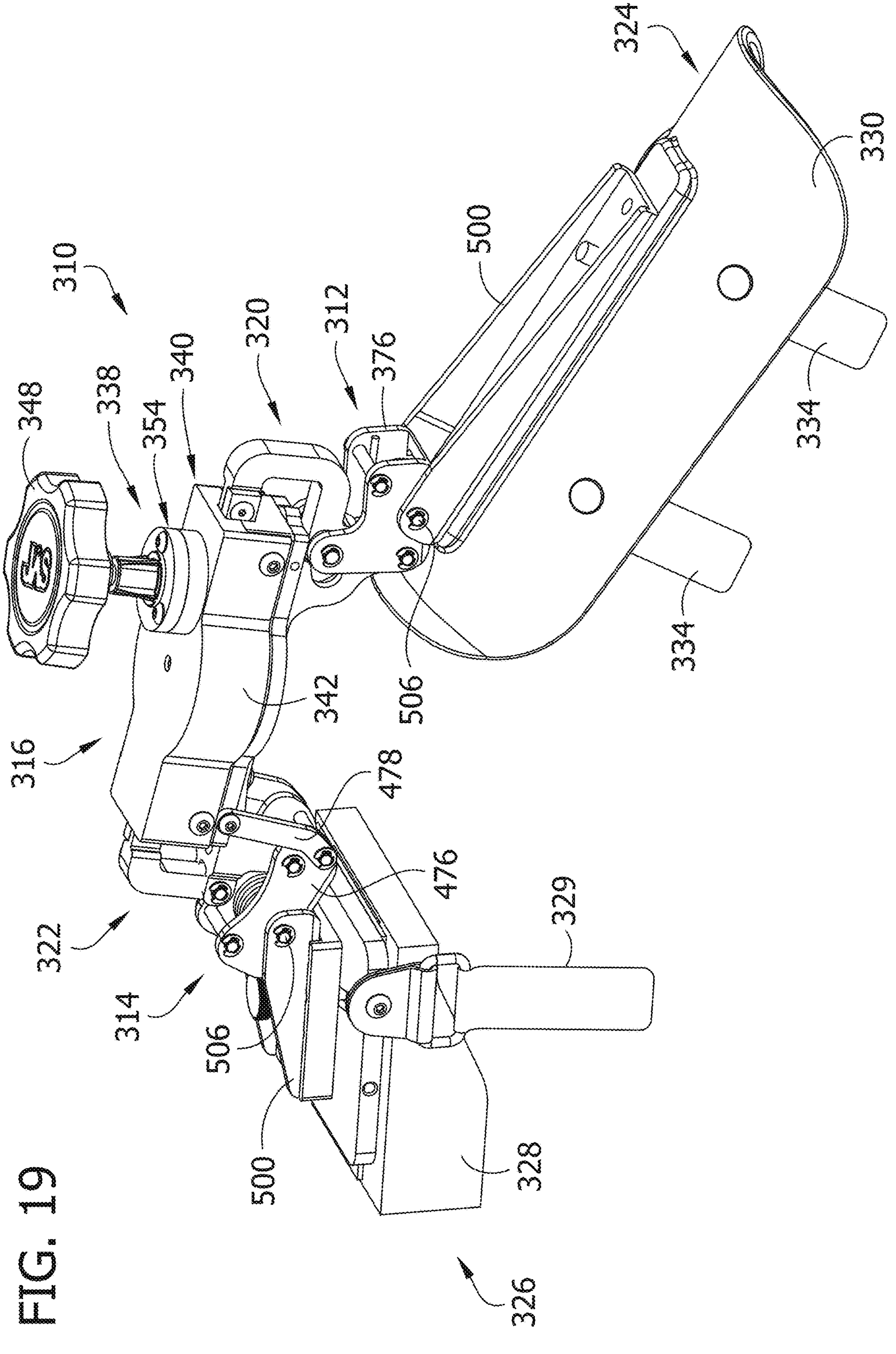
FIG. 19 is perspective of another embodiment of an orthosis.
Figure 20:
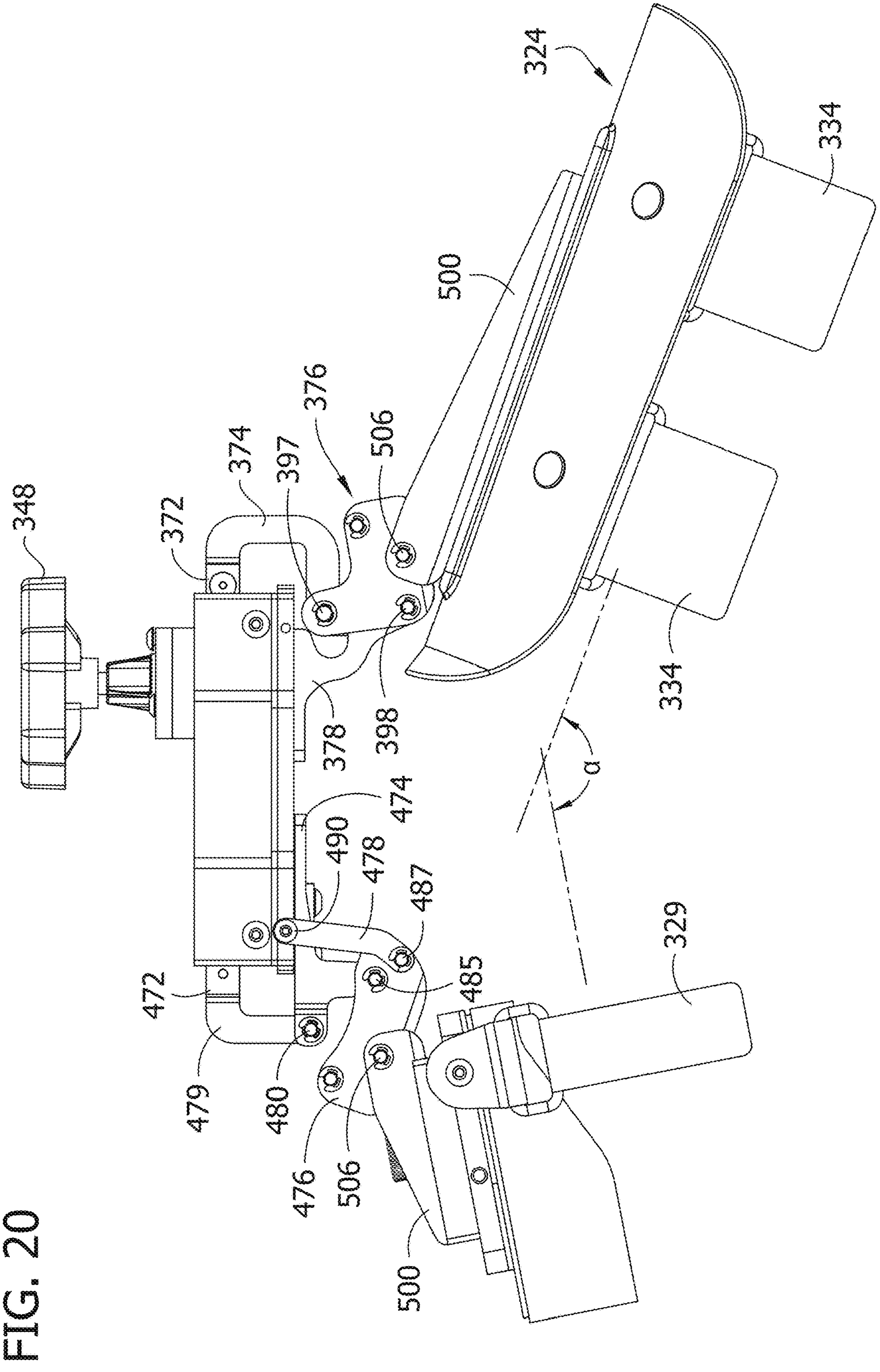
FIG. 20 is a front elevation of the orthosis.
Figure 21:
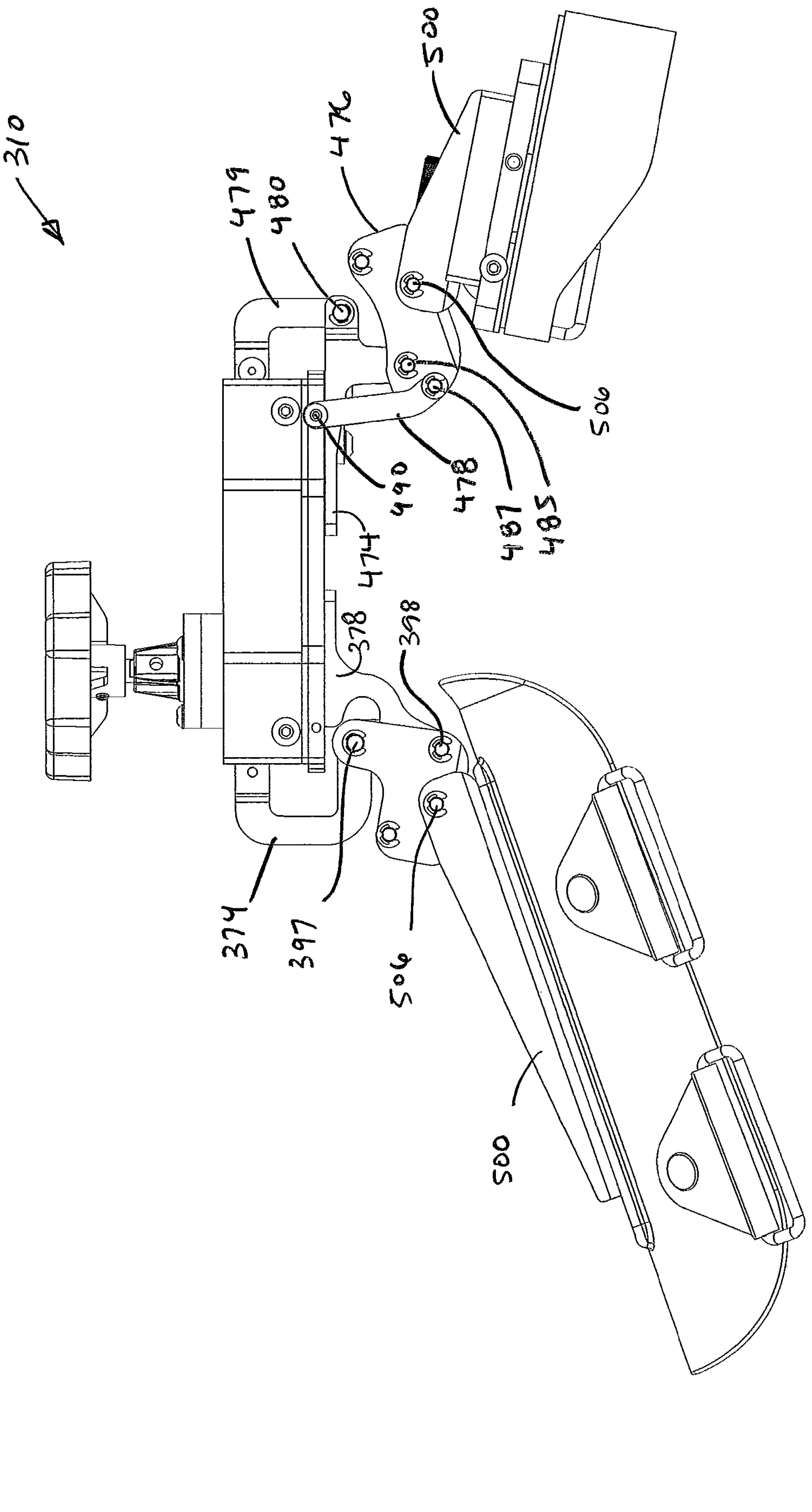
FIG. 21 is a rear elevation of the orthosis.

Referring now to FIGS. 19-21, the second embodiment of the orthosis 310 is a dynamic stretch orthosis comprising first and second dynamic force mechanisms, generally indicated at 312, 314, respectively, for applying a dynamic stretch to respective first and second body portions on opposite sides of a body joint. An actuator mechanism, generally indicated at 316, is operatively connected to first and second linkage mechanism, generally indicated at 320, 322, respectively, for transmitting force to respective first and second dynamic mechanisms 312, 314 and loading the dynamic force mechanism during use, as will be explained in more detail below. First and second cuffs, generally indicated at 324, 326, respectively (broadly, body portion securement members), are secured to the respective first and second dynamic mechanisms 312, 314 for coupling the body portions to the first and second dynamic mechanisms. As with the first illustrated embodiment, the second cuff 326 includes a hand pad 328 and a strap 329 (FIG. 19) for securing a hand to the hand pad; the first cuff 324 include a plastic shell 330, an inner liner (not shown; see FIG. 2) comprising a soft, pliable material, at least one strap 334 (FIG. 19) secured to the plastic shell for fastening the body portion (e.g., a forearm) to the cuff. The strap(s) may include a hook-and-loop fastener as is generally known in the art. Other ways of attaching the cuffs to the desired body portions of opposite sides of a joint do not depart from the scope of the present invention.

As will be understood through the following disclosure, the second orthosis 310, like the first orthosis 10, may be used as a combination dynamic and static-progressive stretch orthosis. It is understood that in other embodiments the dynamic force mechanisms 312, 314 may be omitted without departing from the scope of the present invention, thereby making the orthosis 310 suitable as a static stretch or static progressive stretch orthosis by utilizing the actuator mechanism 316 and/or linkage mechanism 320, 322 of the illustrated orthosis. In addition, it is understood that that in other embodiments the orthosis 310 may include the illustrated dynamic force mechanisms 312, 314, while omitting the illustrated actuator mechanism 316 and/or linkage mechanism 320, 322. It is also understood that the orthosis 310 may be used to increase range of motion of a joint in extension.

The actuator mechanism 316 of the second orthosis embodiment 310 is identical to the actuator mechanism 16 of the first orthosis embodiment 10. Accordingly, reference is made to the above description of the actuator mechanism 16 for disclosure of the present actuator mechanism 316. Briefly, the actuator mechanism 316 includes, among other components, a drive assembly 338, a transmission assembly 340, a transmission housing 342, a knob 348, and and a clutch mechanism 354.

The first linkage mechanism 320 (e.g., the linkage mechanism for the forearm) includes a sliding link 372, a yoke link 374, a bell crank link, generally indicated at 376, and a fixed link 378. In general, the first linkage mechanism 320 is a crank mechanism, and more specifically, a bell crank mechanism. In the illustrated embodiment, the sliding link 372 of the first linkage mechanism 320 is identical to the sliding links 72 of the first orthosis 10. The function and operation of the sliding link 372 is also identical to the sliding links 72 of the first orthosis 10, therefore, the disclosure and teachings set forth above with respect to the sliding links 72 of the first orthosis apply equally to the sliding link 372 of the first linkage mechanism 320 of the present orthosis.

The yoke link 374 of the first linkage mechanism 320 is secured to the end of the first sliding link 372 that is outside the transmission housing 342. In the illustrated embodiment, the yoke link 374 is fastened (e.g., bolted) to the first sliding link 372, although it is understood that the yoke link may be integrally formed with the sliding link. By making the yoke link 374 separate from the sliding link 372, yoke links with different sizes/configurations can be interchangeable on the orthosis 310 to accommodate different body joint sizes and/or different body joints. The yoke link 374 defines a slot-shaped opening 390 (FIG. 22) having a length extending generally transverse (e.g., orthogonal) to the lengths and linear paths of the respective first and second sliding linkages.

Figure 22:
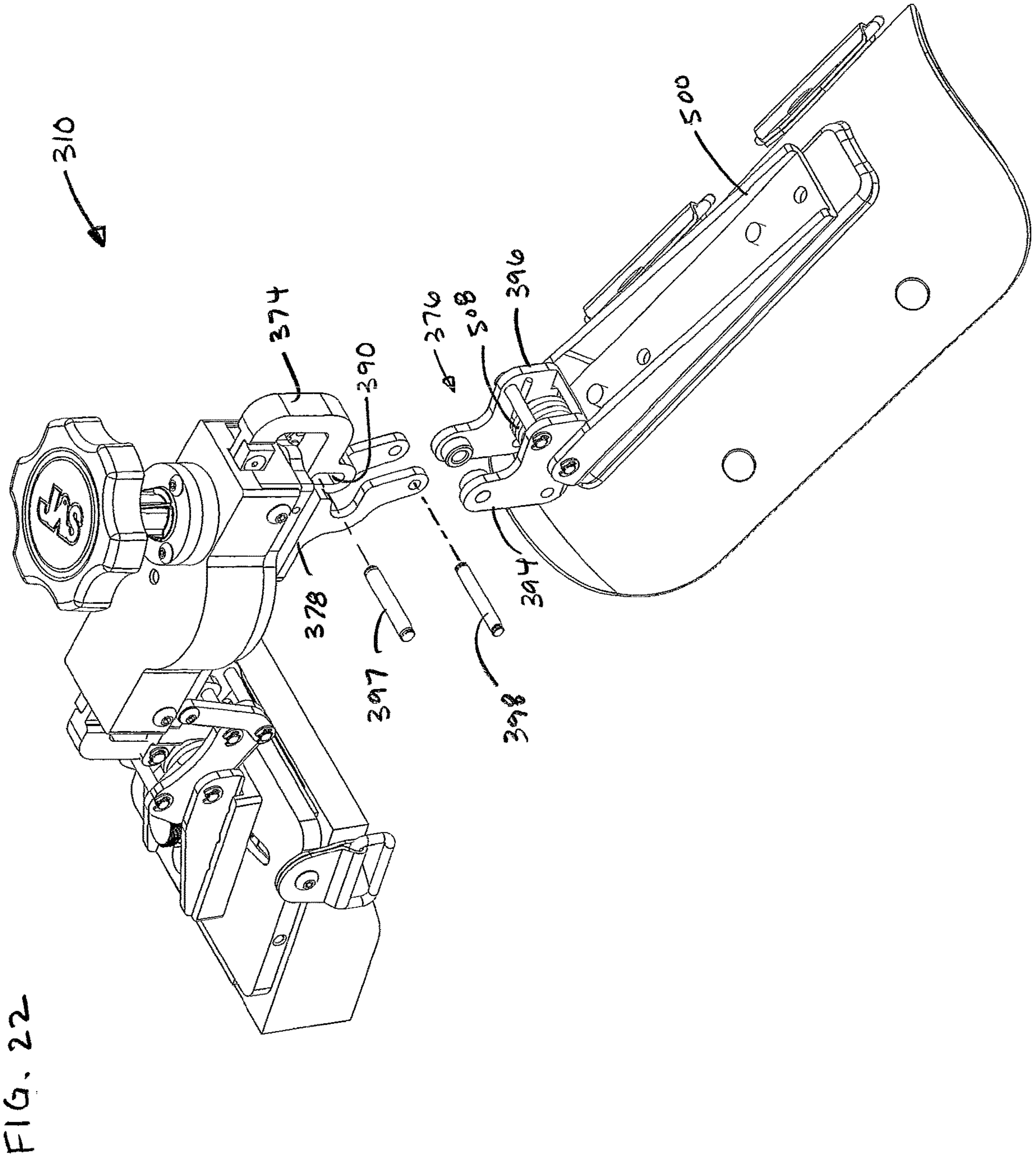
FIG. 22 is a perspective of the orthosis with a first cuff and a portion of a first linkage mechanism exploded therefrom.
Figure 23:
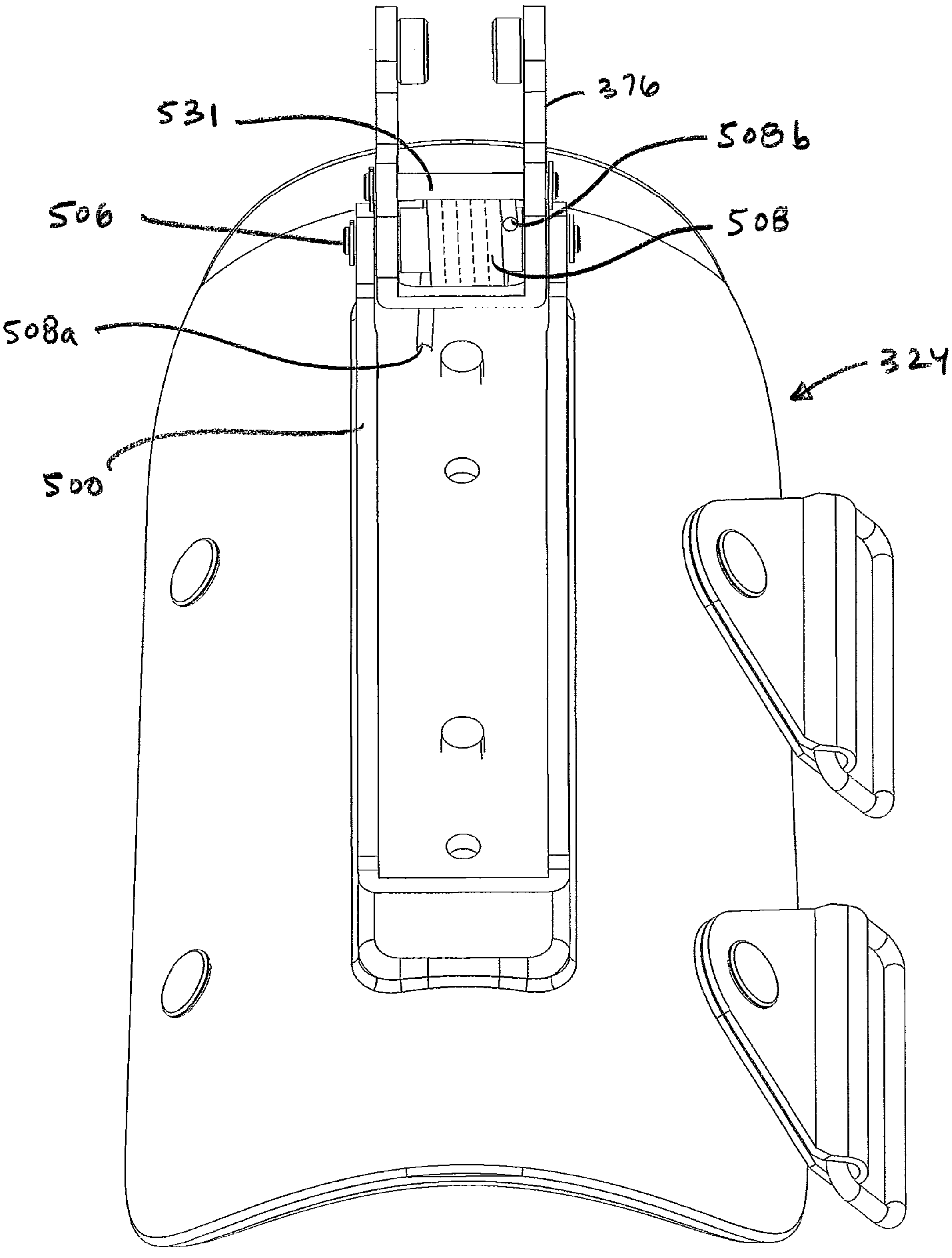
FIG. 23 is side elevation of the exploded portion of FIG. 22.
Figure 24:
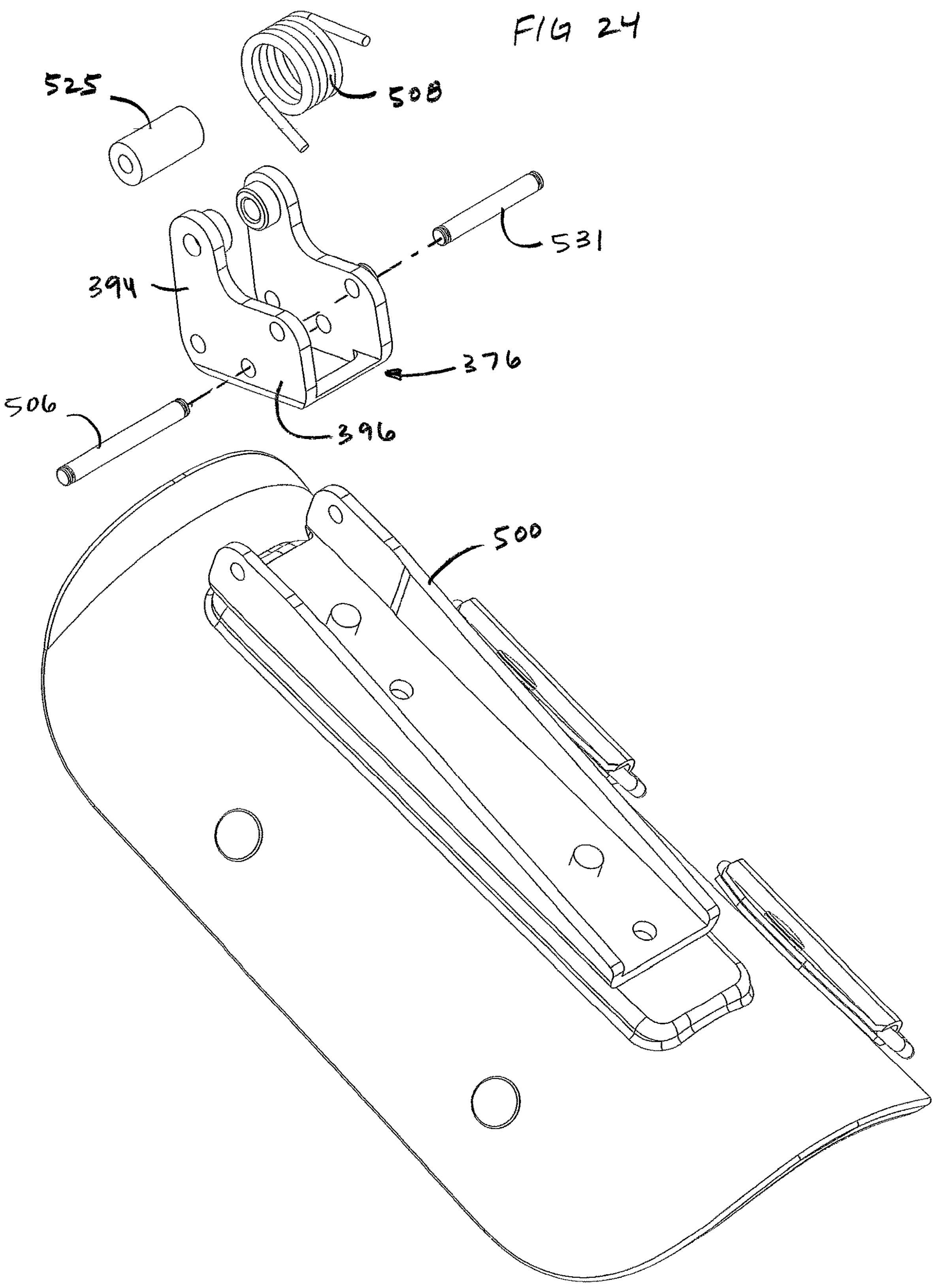
FIG. 24 is an exploded view of the exploded portion of FIG. 23.
Figure 25:
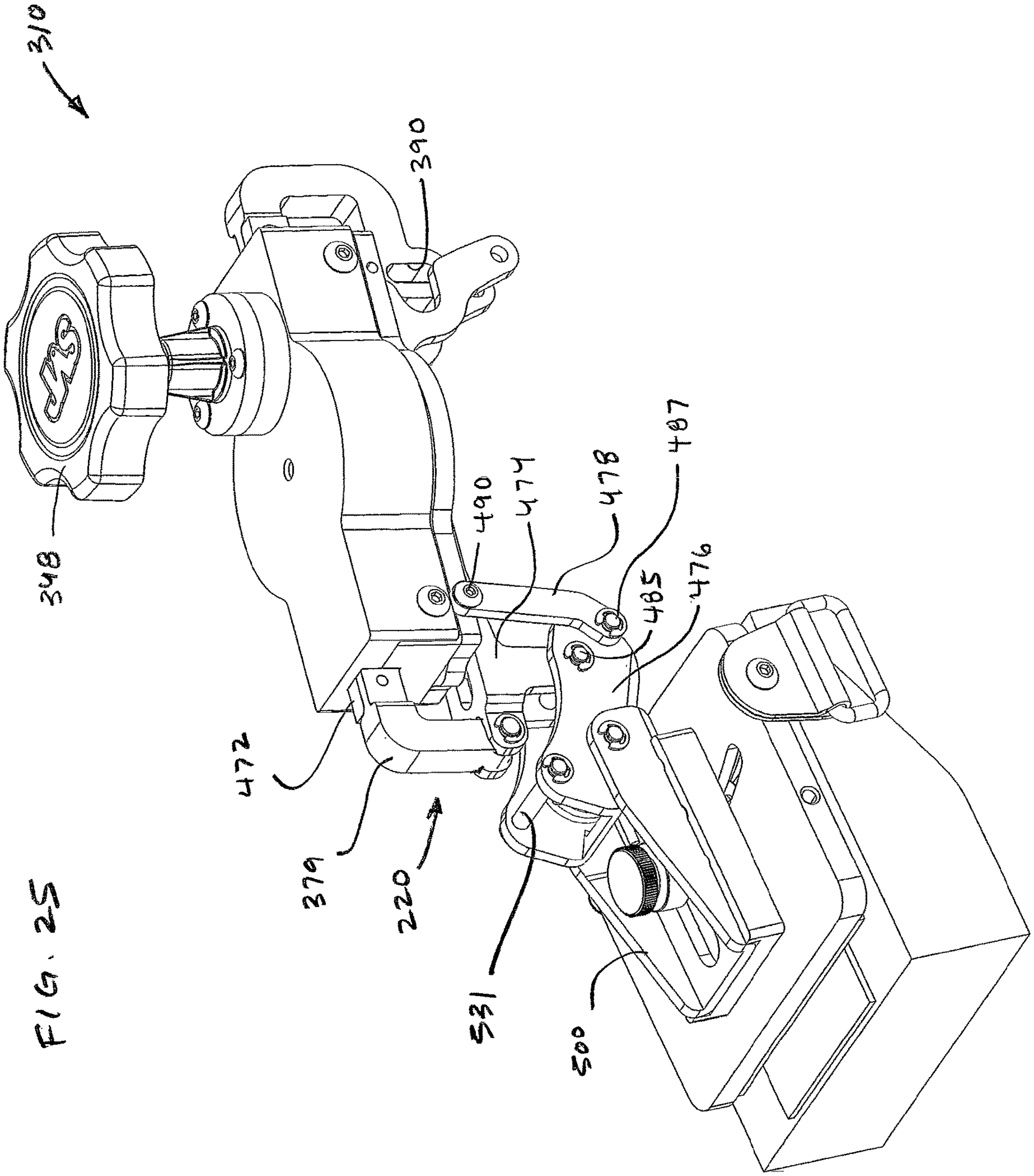
FIG. 25 is a perspective of the orthosis with the exploded portion of FIG. 22 removed therefrom.
Figure 26:
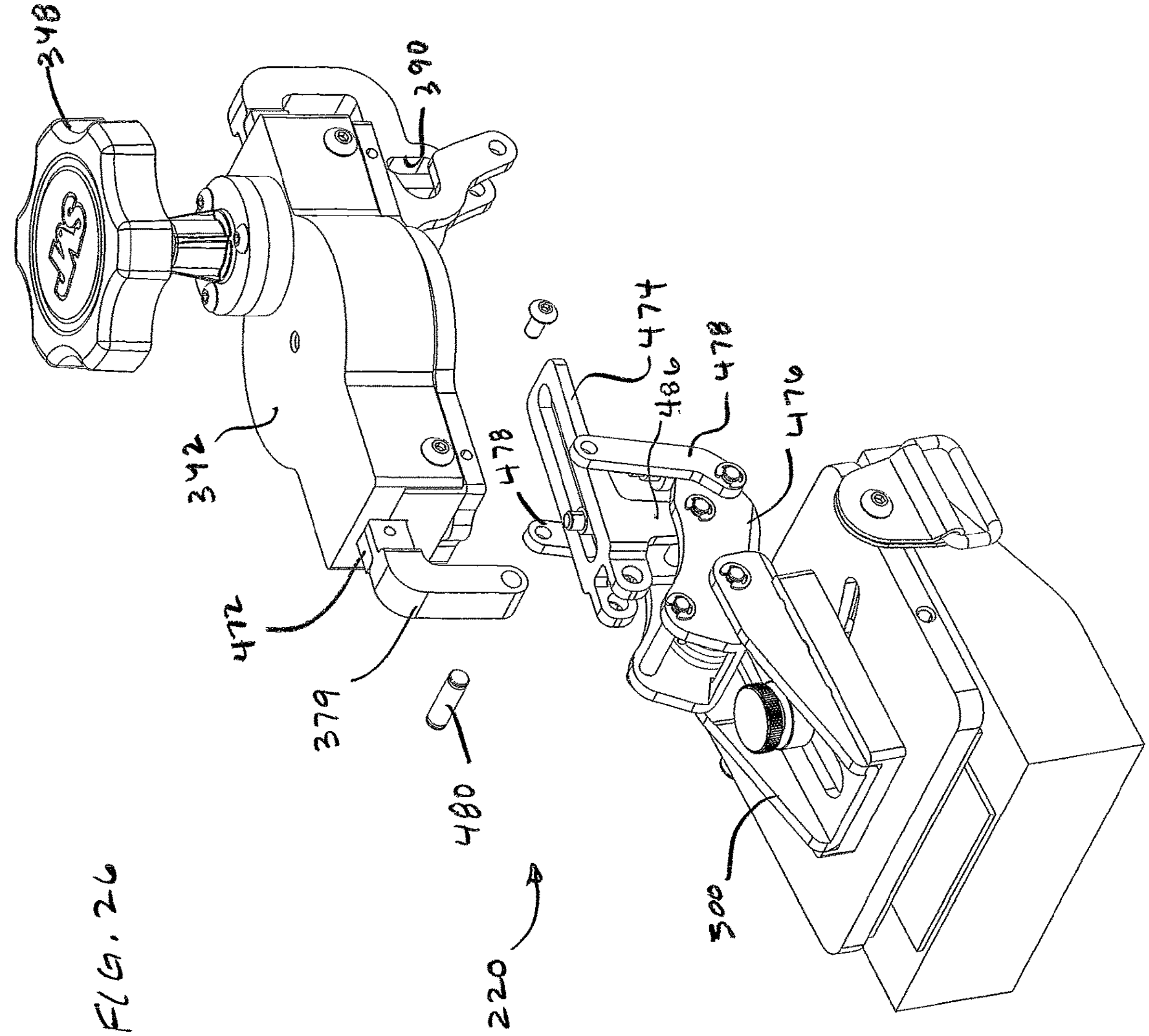
FIG. 26 is an exploded view of FIG. 25, including a second cuff and a portion of a second linkage mechanism exploded therefrom.
Figure 27:
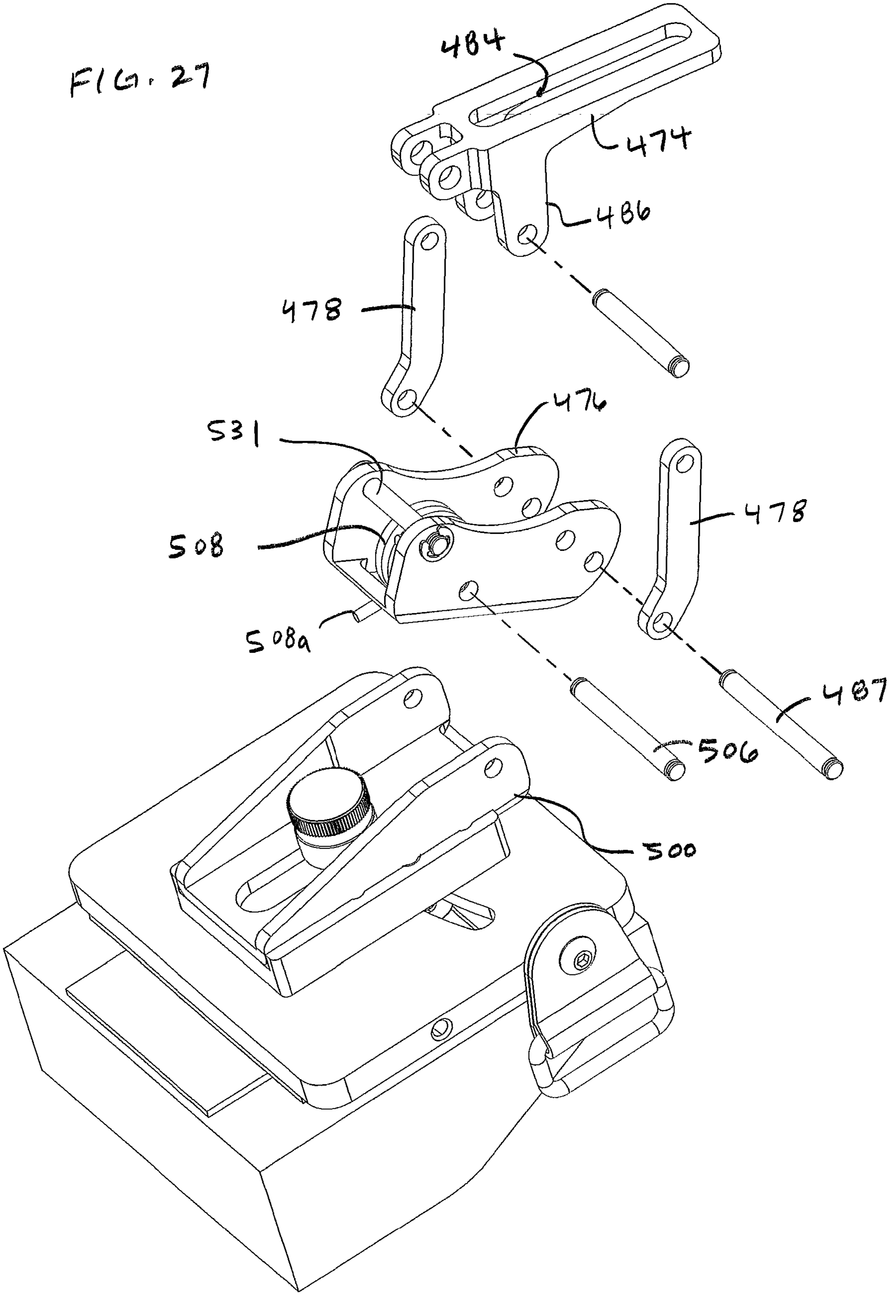
FIG. 27 is an exploded view of the exploded portion of FIG. 26.
Figure 28:
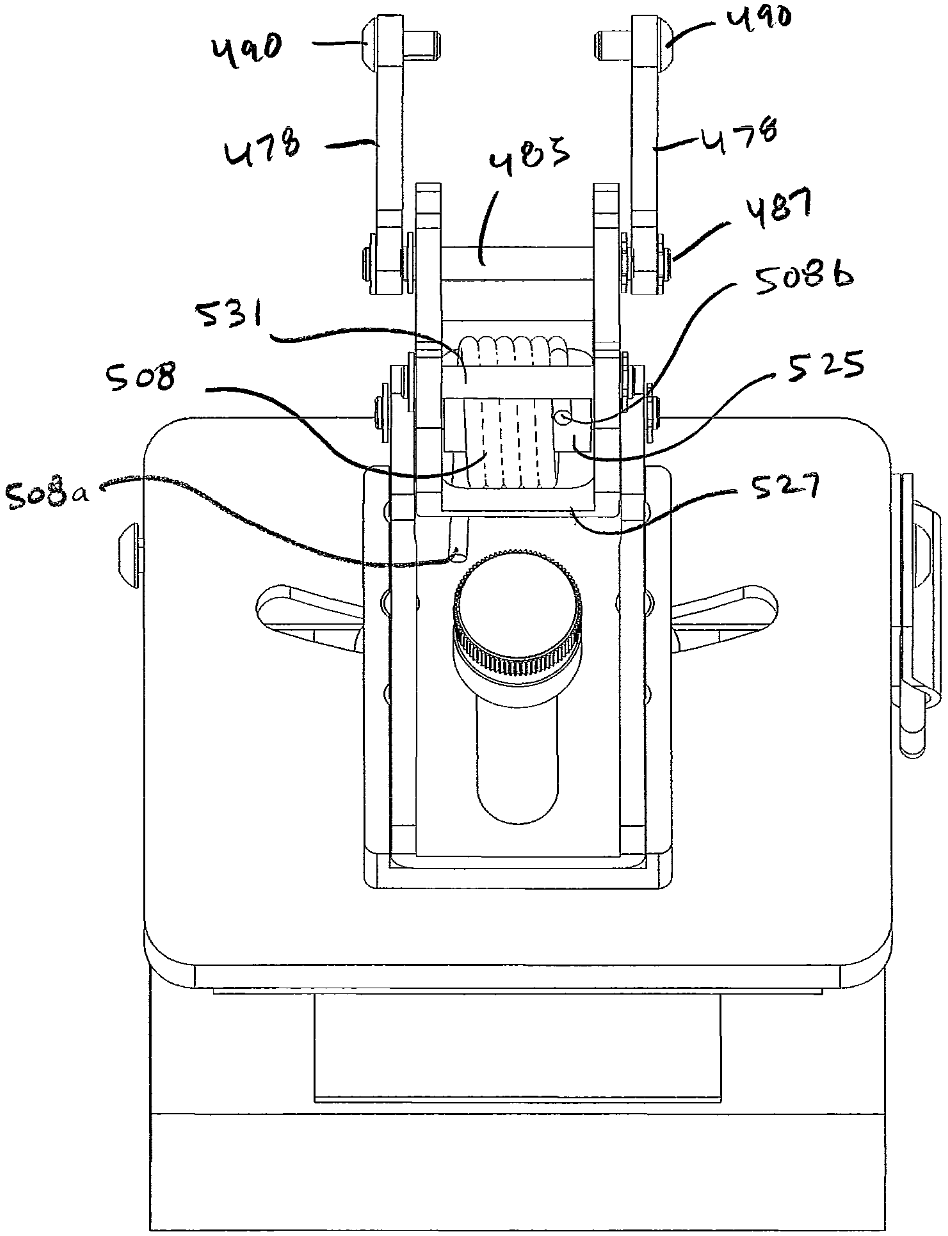
FIG. 28 is a side elevation of the exploded portion of FIG. 26.
Figure 29:
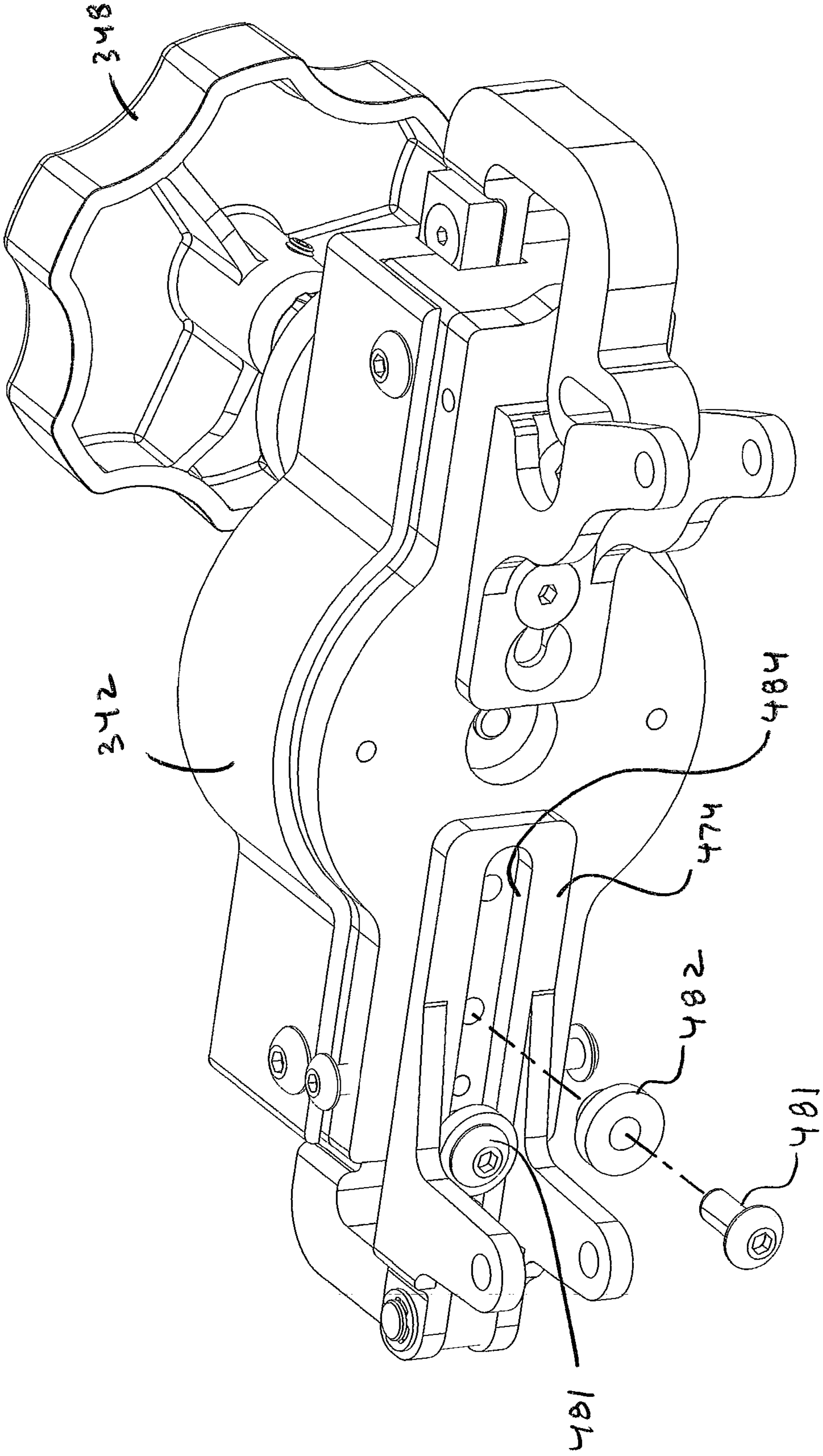
FIG. 29 is a bottom, fragmentary perspective of the orthosis.

The bell crank link 376 of the first linkage mechanism 320 is generally L-shaped, having a first crank arm 394 (or first pair of arms) operatively (i.e., slidingly) connected to the corresponding yoke link 374, and a second crank arm 396 (or second pair of arms) extending outward from the first crank arm in a direction generally transverse to a length of the first crank arm. Referring to FIG. 22, a yoke pin 397 is received in the slot-shaped opening 390 of the yoke link 374 to slidably secure terminal ends of the first crank arm 394 to the yoke link, thereby allowing sliding movement of the bell crank link 376 relative to the corresponding yoke link. The bell crank link 376 is rotatably (e.g., pivotably) attached to terminal end of the fixed link 378 generally adjacent the junction of the first and second crank arm 394, 396. In particular, a fixed link pin 398 pivotably connects the bell crank link 376 to the fixed link 378 so that the bell crank link is rotatable about the pivot pin.

The second linkage mechanism 322 (e.g., the linkage mechanism for the hand) includes a sliding link 472, a slider 474, a connecting link 476, and a crank arm 478. In general, the second linkage mechanism 322 is a crank mechanism, and more specifically, a slider-crank mechanism, and as explained in more detail below, the second linkage mechanism operates to impart both translation and rotation of the second dynamic mechanism 314 and the second cuff 326. In the illustrated embodiment, the sliding link 472 of the second linkage mechanism 322 is identical to the sliding links 72 of the first orthosis 10. The function and operation of the sliding link 472 is also identical to the sliding links 72 of the first orthosis 10; therefore, the disclosure and teachings set forth above with respect to the sliding links of the first orthosis apply equally to the sliding link of the first linkage mechanism of the present orthosis. It is also contemplated that the sliding link 472 and the slider 474 may be integrally formed as a single component.

In the illustrated embodiment, the slider 474 is connected to the sliding link via a connector 479 and a pin 480, although the slider does not rotate relative to the sliding link or the connector. The slider 474 is slidably coupled to the housing 342 at the underside of the housing via one or more fasteners 481 (e.g., screws) and one or more bearings 482 associated with the fasteners. The fasteners 481 extend through a slot 484 defined by the slider 474 and the bearings 482 facilitate sliding, linear movement of the slider relative to the housing 342 in a lateral sliding direction L1. That is, movement of the sliding link 472 imparts sliding movement of the slider 474 relative to the transmission housing 342 in the same direction. The slider 474 may be slidably coupled to the housing 342 in other ways without departing from the scope of the present invention.

The connecting link 476 is pivotably connected to an extension member 486 of the slider via pin 485 and is pivotably connected to the crank arm 478 via pin 487. The extension member 486 extends generally transverse relative to the sliding direction L of the slider 474. The crank arm 478 comprises two crank arms on opposite sides of the connecting link 476. The crank arm 478 is pivotably connected to the housing via a pin 490 (e.g., two pins for two crank arms). A first portion of the connecting link 476 extending between the pins 485, 487 functions as a connecting "rod" of the slider-crank mechanism. A second portion of the connecting link 476 extends laterally outward from the first portion beyond the pin 485. This second portion functions as a output member of the slider-crank mechanism in that the second dynamic mechanism 314 is connected thereto for imparting movement of the second dynamic mechanism and the second cuff 326.

The first and second dynamic force mechanisms 312, 314 are operatively connected to the bell crank link 376 and the connecting link 476, respectively. In the illustrated embodiment, the dynamic force mechanisms 312, 314 include levers 500 to which the corresponding cuffs 324, 326 are secured, and corresponding force elements 508 (e.g., a spring). The levers 500 are pivotably connected to the respective bell crank link 376 and the connecting link 476 by respective lever pivot pins 506 (functioning as a fulcrum).

The force elements 508 apply forces to the respective levers 500 to pivot the levers about the respective pivot pins 506 and relative to the respective bell crank link 376 (more specifically, the second crank arm 396 of the bell crank) and the connecting link 476. In the illustrated embodiment, the force elements 508 are springs (e.g., torsion springs) mounted on respective bell crank link 376 and connecting link 476. In particular, each force element 508 is received on a spring spool or mount 525, and the spring spool is secured to the corresponding bell crank link 376 or connecting link 476 by passing the lever pivot pin 506 through the spool. The first spring arm **508*a* engages a floor 529 of the corresponding lever 500 and the second spring arm 508*b* engages the second crank arm 396 of the corresponding bell crank link 376 or connecting link 476. In particular, the first spring arm 508*a* extends through an opening in the floor 527 of the corresponding one of the second crank arm 596 or connecting link 476 and engages the floor 529 of the lever arm 50 to apply a spring force to the lever arm. The second spring arm 508*b* engages a rod 531** of the corresponding one of the second crank arm or the connecting link.

Figure 32:
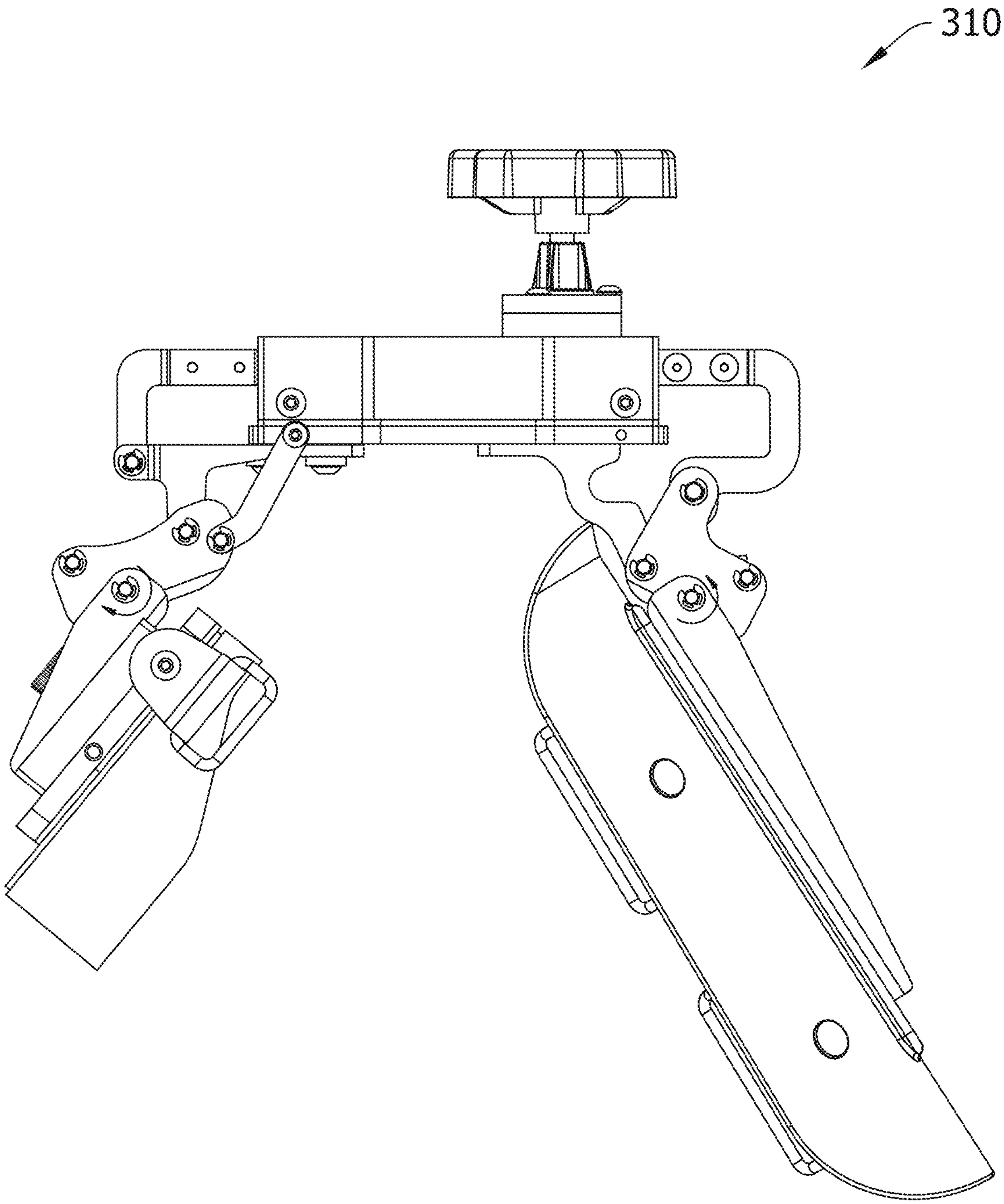
FIG. 32 is similar to FIG. 30 having a third angular configuration in flexion.

As shown in FIG. 32, from the extended positions, the lever arms 50 are pivotable against the force of the spring 508 in a load direction about the pin 506 away from one another and toward the corresponding one of the second crank arm 396 and the connecting link 476 to collapsed positions. Pivoting of the levers 500 about the pins 506 adjusts the included angle between the cuffs 324, 326 (and the lever arms), independent of movement of the linkage mechanism 320, 322 and the actuator mechanism 316, and loads the springs 508 to apply a dynamic torque to the body joint in the flexion direction. Thus, pivoting of the levers 500 also adjusts the angular position of the first and second cuffs 324, 326 relative to one another to facilitate extension and flexion of the body joint, independent of movement of the linkage mechanism 320, 322 and the actuator mechanism 316.

Figure 30:
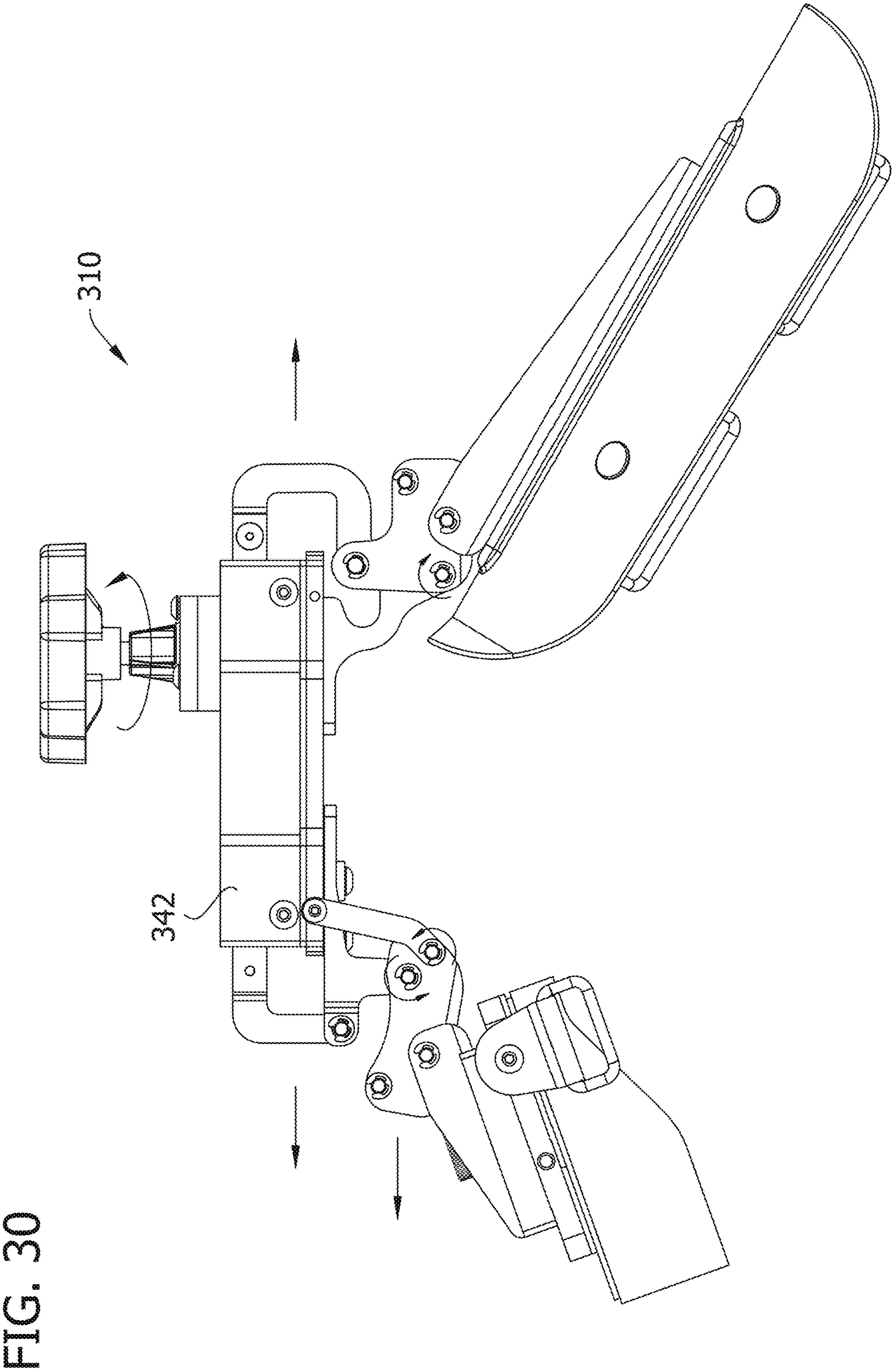
FIG. 30 is a front elevation of the orthosis having a first angular configuration in flexion.
Figure 31:
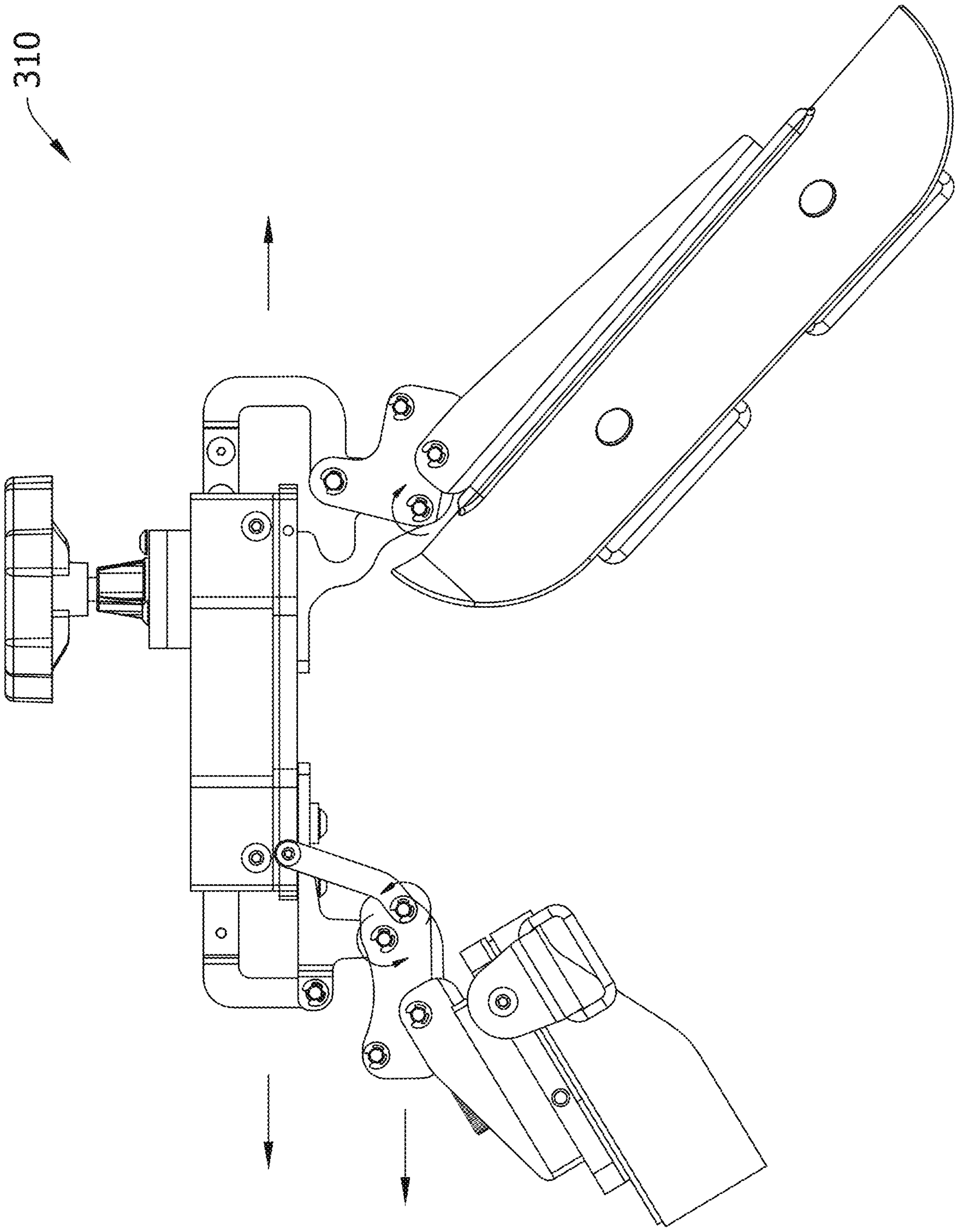
FIG. 31 is similar to FIG. 30 having a second angular configuration in flexion.

Referring to FIGS. 30-32, in an exemplary method of use the orthosis 310 the orthosis is set to a desired initial angle before or after a wearer's hand is secured to the second cuff 326 (e.g., the hand pad) and the associated forearm of the wearer is secured to the first cuff 324. With the orthosis 310 donned, the knob 348 is rotated to impart lateral movement of the sliding links 372, 472 outward away from the transmission housing 342. Lateral movement of the first sliding link 372 imparts rotation of the bell crank 376 about the pin 398 in the flexion direction when there is insufficient counterforce to overcome the spring force applied to the first lever arm 50. Moreover, lateral movement of the second sliding link 472 imparts both rotation of the connecting link 476 about the pins 487, 485 in the flexion direction and translation of the connecting link, the second dynamic mechanism 322 and the second cuff 326. In particular, the slider 474 slides laterally outward from the transmission housing 342, which imparts translation of the connecting link 476 and rotation of the connecting link due to the crank link 478, which also rotates relative to the transmission housing about the pins 490.

At some point in the range of motion in flexion of the body joint (e.g., at the initial flexion position of the body joint or some increase flexion position), rotation of the bell crank 376 and/or the connecting link 476 in the flexion direction does not impart further flexion of the body joint because the stiffness of the body joint overcomes the biasing force of the springs 508. Accordingly, further rotation of the bell crank 376 and the connecting link 476 in the flexion direction moves the second crank arm 396 of the bell crank and the connecting link toward the respective lever arms 50 and the cuffs 324, 326 secured to the lever arms (e.g., relative pivoting of the lever arms and cuffs), as the lever arms and the cuffs stay with the body portions. As the second crank arm 396 of the bell crank 376 and the connecting link 476 pivot toward the lever arms 50 about the lever pivot pins 506, the springs 508 elastically deform (e.g., compress) on the spring mounts. Elastic deformation of the springs 508 (not shown) produces a dynamic force F on the lever arms in the flexion direction biasing the lever arms 50 away from the respective second crank arm 596 of the bell crank 576 and the connecting link 476, which in turn, produces a biasing dynamic force of the spring on the body portions in the flexion direction. Further pivoting of the bell crank 376 and the connecting link 476 by turning the knob 648 decreases the angular distances between the second crank arm 396 and the associated lever arm 50 and the connecting link and the associated lever arm, thereby increasing the dynamic force F of the springs imparted on the body portions in the flexion direction. The bell crank 376 and the connecting link 476 are pivoted to a suitable treatment position in which the biasing forces of the springs are constantly applied to both sides of the body joint in the flexion direction. The application of this biasing force F utilizes the principles of creep to continuously stretch the joint tissue during a set time period (e.g., 4-8 hours), thereby maintaining, decreasing, or preventing a relaxation of the tissue.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An orthosis for increasing range of motion of a body joint, the orthosis comprising:

first and second dynamic force mechanisms for simultaneously applying a dynamic force to body portions on opposite sides of a body joint; and first and second linkage mechanisms operably connected to the corresponding one of the first and second dynamic force mechanisms, wherein the first and second dynamic force mechanisms each comprise a lever arm and a force element, the lever arms being pivotably connected to corresponding bell cranks by lever pivot pins, the force elements being configured to apply torques to respective lever arms to pivot the lever arms about the lever pivot pins and relative to the respective bell crank links in a biased direction.

2. The orthosis of claim 1, wherein the first and second linkage mechanisms comprise first and second bell crank links and first and second yoke links, the first and second bell crank links operatively connected to the corresponding yoke link.

3. The orthosis of claim 2, wherein the first and second dynamic force mechanisms are configured to adjust position by translating along the corresponding bell crank links.

4. The orthosis of claim 1, wherein rotation in the biased direction of the first and second bell crank links adjusts an angular position of first and second cuffs relative to one another to facilitate extension or flexion of the body joint.

5. The orthosis of claim 1, wherein the first and second linkage mechanisms are operatively connected to an output gear of a transmission assembly.

6. The orthosis of claim 5, comprising the transmission assembly and a drive assembly, the drive assembly comprises an input shaft, a knob, and a clutch mechanism, the transmission assembly comprising an input gear connected to the input shaft, a reduction gear, an output shaft, and the output gear.

7. The orthosis of claim 6, wherein the input gear is rotatable about an input axis, while each of the reduction gear, output shaft, and output gear are rotatable about an output axis, the input gear is operatively connected to the reduction gear for driving rotation of the reduction gear about the output axis.

8. The orthosis of claim 7, wherein the output axis is generally parallel to the input axis.

9. The orthosis of claim 7, wherein the reduction gear is configured to reduce rotational speed transmitted from the input gear to the output gear while increasing torque transmitted from the input gear to the output gear.

10. The orthosis of claim 1, comprising an actuator mechanism operatively connected to first and second linkage mechanism for transmitting force to respective first and second dynamic force mechanisms and loading the first and second dynamic force mechanisms for applying the dynamic force to the body portions.

11. The orthosis of claim 1, wherein the first and second linkage mechanism is at least one of a bell crank mechanism and a slider crank mechanism.

12. An orthosis for increasing range of motion of a body joint, the orthosis comprising:

an actuator mechanism;

first and second linkage mechanisms operatively connected to the actuator mechanism, the first and second linkage mechanisms being crank mechanisms comprising first and second bell crank links;

first and second cuffs operatively connected to the first and second linkage mechanisms, wherein the first and second linkage mechanisms are configured to transmit force from the actuator mechanism to the respective first and second cuffs to impart movement of the first and second cuffs relative to one another;

first and second dynamic force mechanisms operably connected to the first and second bell crank links and comprising levers corresponding to the first and second cuffs, wherein the first and second dynamic force mechanisms comprise a lever arm and a force element, the lever arms being pivotably connected to corresponding bell crank links by lever pivot pins, the force elements being configured to apply torques to respective lever arms to pivot the lever arms about the lever pivot pins and relative to the respective bell crank links in a biased direction.

13. The orthosis of claim 12, wherein the first and second dynamic force mechanisms dynamically stretch respective first and second body portions on opposite sides of the body joint, the first and second cuffs being on the opposite sides of a body joint.

14. The orthosis of claim 12, wherein rotation in the biased direction of the first and second bell crank links adjusts an angular position of the first and second cuffs relative to one another to facilitate movement of the body joint.

15. The orthosis of claim 14, wherein the movement of the body joint is at least one of extension, flexion, adduction, abduction, pronation, or supination.

16. The orthosis of claim 14, wherein operation of the actuator mechanism imparts rotation of the first and second bell crank links about the to adjust an angular position of the first and second cuffs relative to one another.

17. The orthosis of claim 12, wherein the actuator mechanism is a linear actuator mechanism configured to convert rotational movement into linear movement of at least a portion of the first and second linkage mechanisms.

18. An orthosis for increasing range of motion of a body joint, the orthosis comprising:

first and second dynamic force mechanisms for simultaneously applying a dynamic force to body portions on opposite sides of a body joint; and first and second linkage mechanisms operably connected to the corresponding one of the first and second dynamic force mechanisms;

a transmission assembly, wherein the first and second linkage mechanisms are operatively connected to an output gear of a transmission assembly;

a drive assembly, the drive assembly comprises an input shaft, a knob, and a clutch mechanism, wherein the transmission assembly comprises an input gear connected to the input shaft, a reduction gear, an output shaft, and the output gear, wherein the input gear is rotatable about an input axis, while each of the reduction gear, output shaft, and output gear are rotatable about an output axis, the input gear is operatively connected to the reduction gear for driving rotation of the reduction gear about the output axis, wherein the output axis is generally parallel to the input axis.

* * * * *